US008104429B2

(12) United States Patent
Bennett

(10) Patent No.: US 8,104,429 B2
(45) Date of Patent: Jan. 31, 2012

(54) PET IMPACT PROTECTOR

(76) Inventor: Gary Ray Bennett, Cumming, GA (US)

( * ) Notice: Subject to any disclaimer, the term of this patent is extended or adjusted under 35 U.S.C. 154(b) by 425 days.

(21) Appl. No.: 12/266,838

(22) Filed: Nov. 7, 2008

(65) Prior Publication Data
US 2009/0126638 A1    May 21, 2009

(51) Int. Cl.
A01K 29/00 (2006.01)
(52) U.S. Cl. ........................ 119/28.5; 119/771
(58) Field of Classification Search ............... 119/28.5, 119/771; 297/216.1, 216.15–216.19, 378.1, 297/378.11, 463.2
See application file for complete search history.

(56) References Cited

U.S. PATENT DOCUMENTS

| | | | |
|---|---|---|---|
| 754,329 A | 3/1904 | Milliken | |
| 2,013,481 A | 9/1935 | Stonehill | |
| 2,109,881 A | 3/1938 | Goldberg | |
| 2,190,566 A | 2/1940 | Julian | |
| D141,774 S | 7/1945 | Belz | |
| 2,909,154 A | 10/1959 | Thomas | |
| D205,507 S | 8/1966 | Melchior | |
| 3,310,034 A | 3/1967 | Dishart | |
| D213,786 S | 4/1969 | Pohl | |
| D214,302 S | 6/1969 | Barber | |
| 3,655,242 A * | 4/1972 | Ghyczy | 297/451.11 |
| D226,997 S | 5/1973 | Oliver | |
| 3,807,801 A | 4/1974 | Dalsgard | |
| D233,285 S | 10/1974 | Gill et al. | |
| D237,764 S | 11/1975 | Prevost | |
| D239,395 S | 3/1976 | David | |
| D245,716 S | 9/1977 | Russo | |
| 4,092,049 A | 5/1978 | Schoblom | |
| D256,200 S | 8/1980 | Radford, Sr. | |
| 4,230,364 A | 10/1980 | Parker | |
| 4,232,899 A | 11/1980 | Fister | |
| D261,952 S | 11/1981 | Valdez | |
| D264,163 S | 5/1982 | Chapman | |
| D276,487 S | 11/1984 | Kao | |
| 4,500,135 A * | 2/1985 | Kincheloe | 297/216.11 |
| 4,512,286 A | 4/1985 | Rux | |
| D281,655 S | 12/1985 | Carter | |
| 4,583,253 A | 4/1986 | Hall | |
| 4,597,359 A | 7/1986 | Moorman | |
| 4,597,605 A | 7/1986 | Gilbert | |
| 4,607,402 A | 8/1986 | Pollard | |
| D289,123 S | 4/1987 | Tennen | |
| 4,666,207 A | 5/1987 | Quartano | |
| D294,752 S | 3/1988 | Palier | |
| D298,788 S | 12/1988 | Thompson | |
| D300,694 S | 4/1989 | Krok | |
| 4,821,353 A | 4/1989 | Neri | |
| 4,889,383 A * | 12/1989 | Jones | 297/16.1 |
| 4,896,630 A | 1/1990 | Luce | |
| 4,907,541 A | 3/1990 | Thompson | |
| D309,228 S | 7/1990 | McVicar | |

(Continued)

Primary Examiner — Kimberly Smith
(74) Attorney, Agent, or Firm — C. Douglas McDonald; Carlton Fields, P.A.

(57) ABSTRACT

A pet impact protector is disclosed. This device is directed to a cleanable, removable device for a vehicle car seat comprising a contiguous pliable material having a pet seating area and a pet capture area. The pet impact protector is designed such that the force of the pet impact protector plus the pet, upon impact with the vehicle during a stop or slowing of the vehicle, causes the pet impact protector to partially collapse and form a protective impact area around the pet. This device is directed to the reduction of injury to a pet riding in a vehicle during an accident, stop or slowdown of the vehicle.

8 Claims, 21 Drawing Sheets

U.S. PATENT DOCUMENTS

| | | | |
|---|---|---|---|
| D309,514 | S | 7/1990 | Marcus et al. |
| 4,943,105 | A | 7/1990 | Kacar et al. |
| 5,005,526 | A | 4/1991 | Parker |
| 5,005,902 | A | 4/1991 | Farnworth et al. |
| 5,035,203 | A | 7/1991 | Cardenas |
| 5,044,321 | A | 9/1991 | Selph |
| 5,123,377 | A | 6/1992 | Edwards |
| 5,133,294 | A | 7/1992 | Reid |
| D328,506 | S | 8/1992 | McMahon |
| D328,683 | S | 8/1992 | Kalozdi |
| 5,147,109 | A | 9/1992 | Jolly |
| D332,012 | S | 12/1992 | Severance |
| D335,035 | S | 4/1993 | Floyd |
| D335,235 | S | 5/1993 | Hildreth |
| 5,220,884 | A | 6/1993 | Townsend |
| 5,226,184 | A | 7/1993 | Cheng |
| D338,284 | S | 8/1993 | Barreto, III et al. |
| D339,556 | S | 9/1993 | Berglund |
| D340,555 | S | 10/1993 | Ott |
| D341,981 | S | 12/1993 | Harris |
| D342,164 | S | 12/1993 | Dalman |
| D342,835 | S | 1/1994 | Mink |
| D342,857 | S | 1/1994 | Mocur |
| D343,756 | S | 2/1994 | Sher |
| D346,702 | S | 5/1994 | Jackson |
| D347,120 | S | 5/1994 | Artz |
| 5,310,245 | A | 5/1994 | Lyszczasz |
| D351,506 | S | 10/1994 | Artz |
| 5,351,348 | A | 10/1994 | Beger |
| D353,494 | S | 12/1994 | Beger |
| D354,868 | S | 1/1995 | Bowlby |
| 5,385,390 | A * | 1/1995 | Freeman et al. ............... 297/380 |
| 5,388,295 | A * | 2/1995 | Sarkozi ............... 5/630 |
| D355,999 | S | 3/1995 | Townsend |
| D364,977 | S | 12/1995 | Hine |
| D366,368 | S | 1/1996 | McCarthy |
| 5,479,892 | A | 1/1996 | Edwards |
| 5,487,361 | A | 1/1996 | Dean |
| D369,683 | S | 5/1996 | Fedorka |
| D370,586 | S | 6/1996 | Olah |
| D370,956 | S | 6/1996 | Pery |
| 5,529,341 | A | 6/1996 | Hartigan |
| D372,805 | S | 8/1996 | Bonaddio et al. |
| 5,551,373 | A | 9/1996 | O'Donnell |
| D376,447 | S | 12/1996 | Stump |
| D380,118 | S | 6/1997 | Ford |
| 5,639,145 | A * | 6/1997 | Alderman ................ 297/452.45 |
| D381,234 | S | 7/1997 | Lupoff |
| D383,261 | S | 9/1997 | Karsten et al. |
| 5,685,258 | A | 11/1997 | Fricano |
| 5,785,003 | A | 7/1998 | Jacobson et al. |
| 5,794,571 | A | 8/1998 | Goldberg |
| D398,181 | S | 9/1998 | Lange et al. |
| D398,802 | S | 9/1998 | Quinn |
| D399,086 | S | 10/1998 | Costantino |
| D399,695 | S | 10/1998 | Loud |
| 5,823,217 | A | 10/1998 | Rice |
| D404,239 | S | 1/1999 | Denney |
| D404,880 | S | 1/1999 | Chipperfield |
| D405,854 | S | 2/1999 | Grant |
| D407,259 | S | 3/1999 | Jackson |
| 5,915,335 | A | 6/1999 | Holt, Jr. |
| D413,037 | S | 8/1999 | Bellington |
| 5,944,379 | A * | 8/1999 | Yates ............... 297/129 |
| D414,003 | S | 9/1999 | Hering |
| D415,656 | S | 10/1999 | Henry |
| 5,967,601 | A * | 10/1999 | Gillins ............... 297/184.15 |
| D416,428 | S | 11/1999 | Jackson |
| 6,033,017 | A * | 3/2000 | Elqadah et al. ............ 297/216.1 |
| D422,419 | S | 4/2000 | Vu |
| D422,444 | S | 4/2000 | Lenahan et al. |
| D422,829 | S | 4/2000 | Kritzinger |
| 6,044,505 | A | 4/2000 | Friedman |
| 6,079,370 | A | 6/2000 | Birmani et al. |
| D427,833 | S | 7/2000 | Robinson |
| D429,038 | S | 8/2000 | Forester |
| D431,724 | S | 10/2000 | Peterson |
| D435,187 | S | 12/2000 | Giulian |
| D438,717 | S | 3/2001 | Carroll, III |
| D440,358 | S | 4/2001 | Stewart |
| D443,116 | S | 5/2001 | Badler |
| 6,237,531 | B1 | 5/2001 | Peeples et al. |
| 6,253,713 | B1 | 7/2001 | Giedeman, III et al. |
| D446,674 | S | 8/2001 | Chapman et al. |
| D461,966 | S | 8/2002 | Reece |
| 6,427,635 | B1 | 8/2002 | Ballard |
| 6,439,659 | B1 * | 8/2002 | Neubauer, Jr. ........... 297/188.01 |
| D465,620 | S | 11/2002 | Stepp |
| 6,564,749 | B1 | 5/2003 | Dorsey |
| 6,564,750 | B1 | 5/2003 | Collins |
| 6,574,810 | B2 | 6/2003 | Mangiaracina |
| 6,591,787 | B1 | 7/2003 | Gantz |
| 6,637,377 | B2 | 10/2003 | Lobanoff et al. |
| 6,641,220 | B2 | 11/2003 | Clegg |
| D485,021 | S | 1/2004 | Gonzalez |
| D486,611 | S | 2/2004 | Spence et al. |
| D492,830 | S | 7/2004 | Rogers |
| 6,827,044 | B2 | 12/2004 | Lobanoff et al. |
| 6,848,746 | B2 * | 2/2005 | Gentry ............... 297/380 |
| D505,754 | S | 5/2005 | Cohen-Fyffe |
| D528,707 | S | 9/2006 | Deioma |
| D532,241 | S | 11/2006 | Choiniere |
| D553,805 | S | 10/2007 | Martin et al. |
| 7,438,356 | B2 * | 10/2008 | Howman et al. ......... 297/180.11 |
| 7,571,961 | B2 * | 8/2009 | Gold et al. ............... 297/255 |
| 2005/0236874 | A1 | 10/2005 | Godshaw et al. |
| 2007/0157891 | A1 | 7/2007 | Wayn |
| 2008/0011234 | A1 | 1/2008 | Wilkes |

* cited by examiner

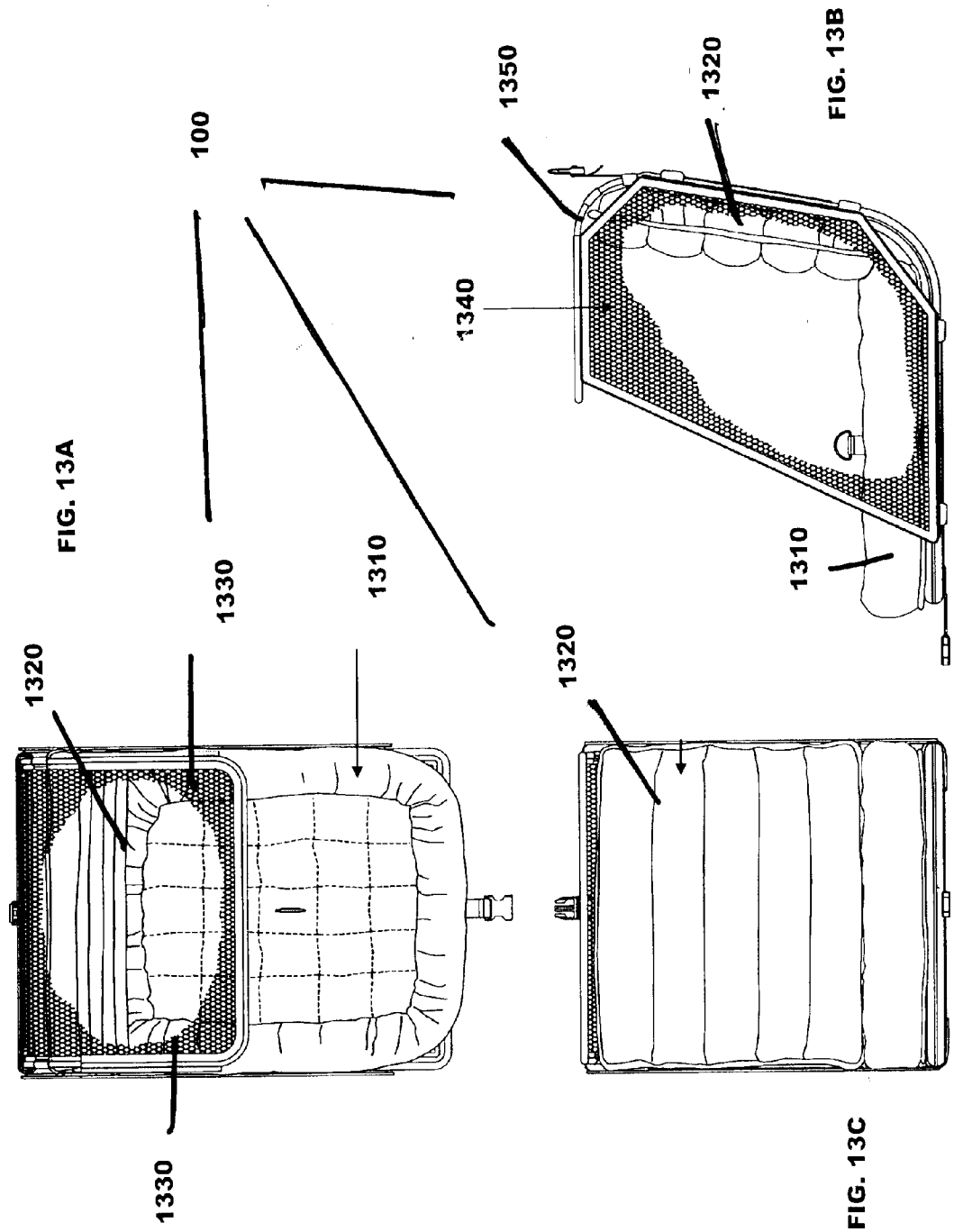

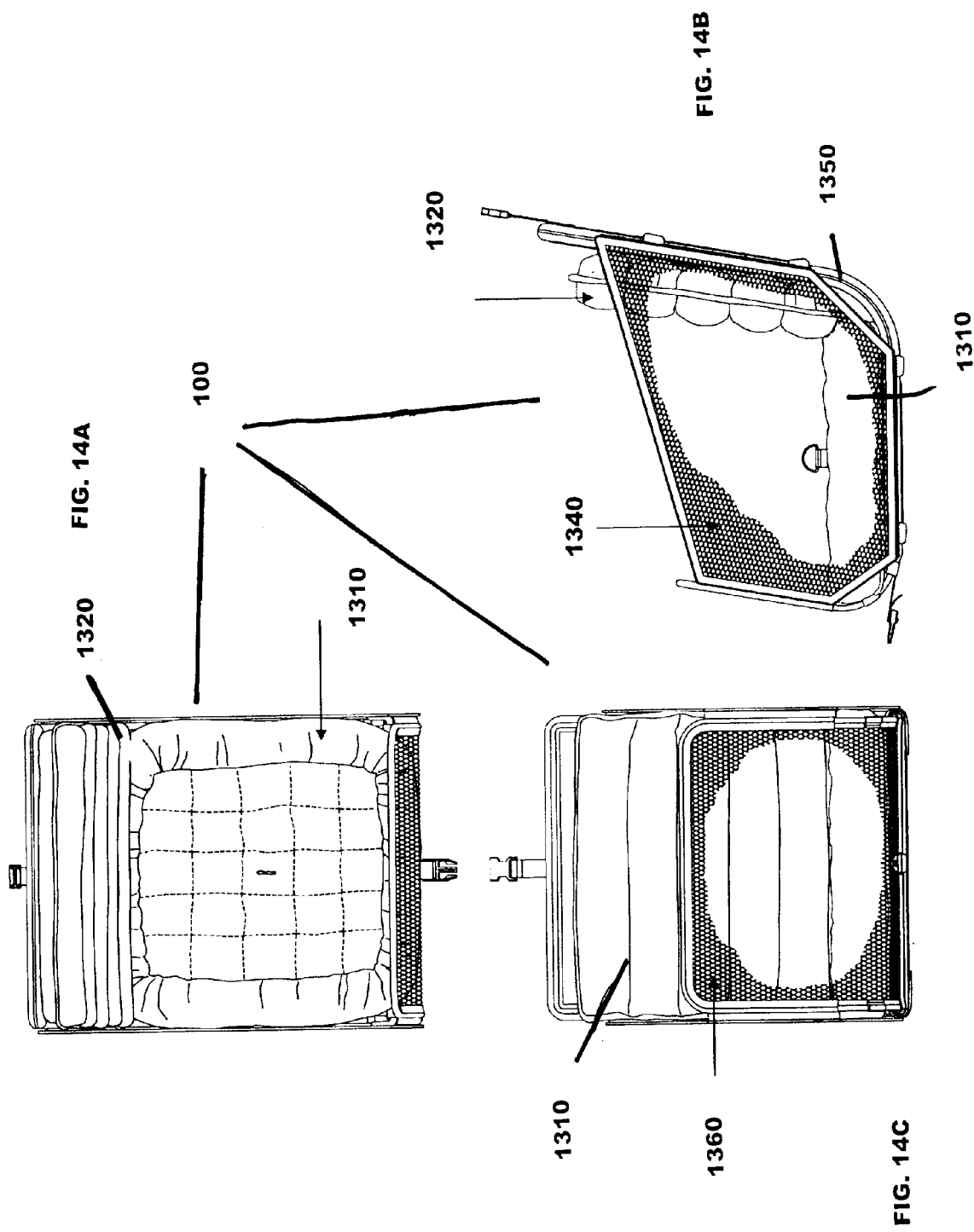

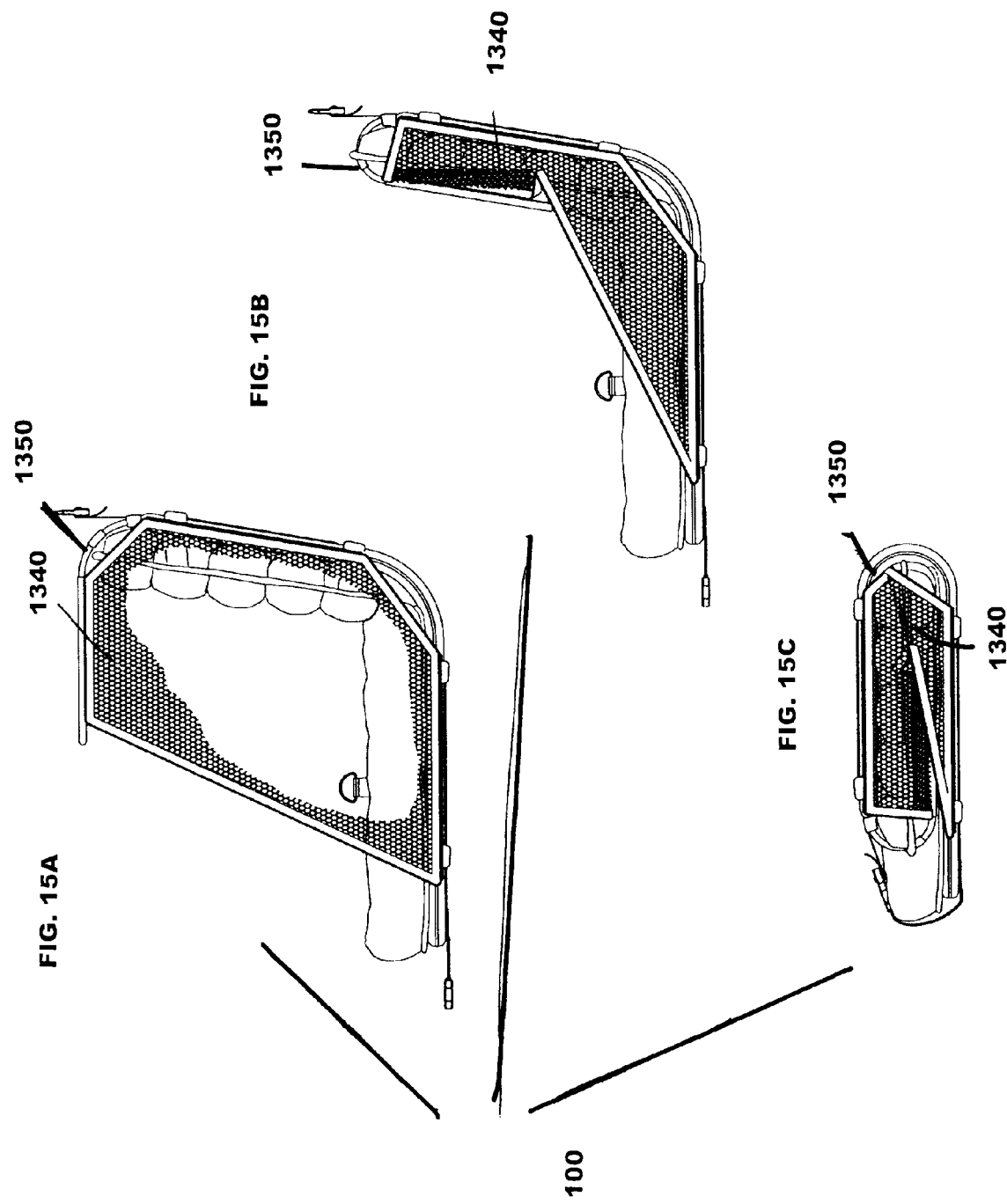

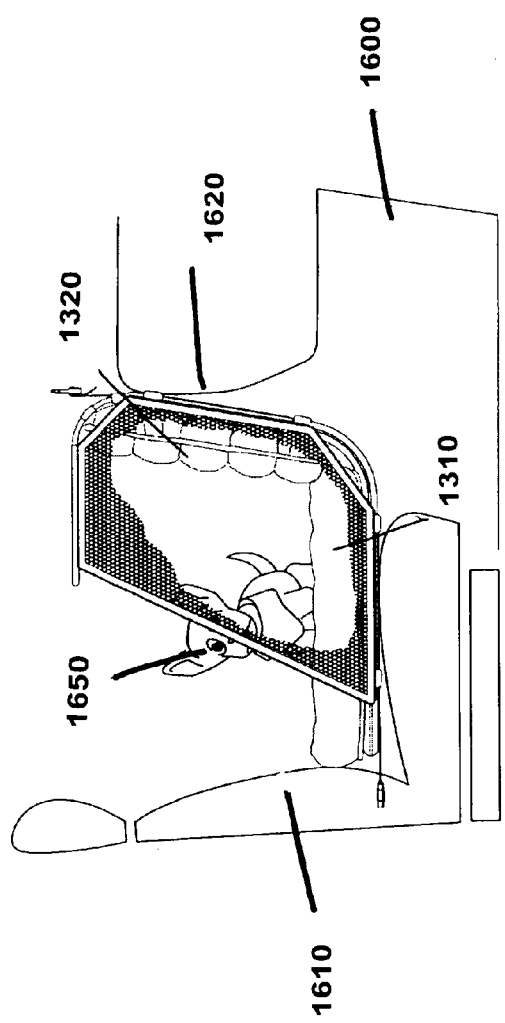
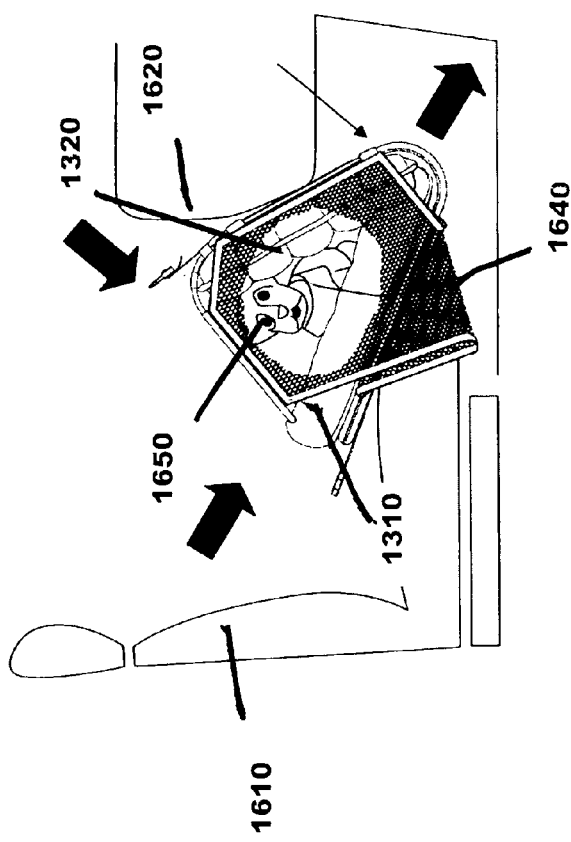
FIG. 16A
FIG. 16B

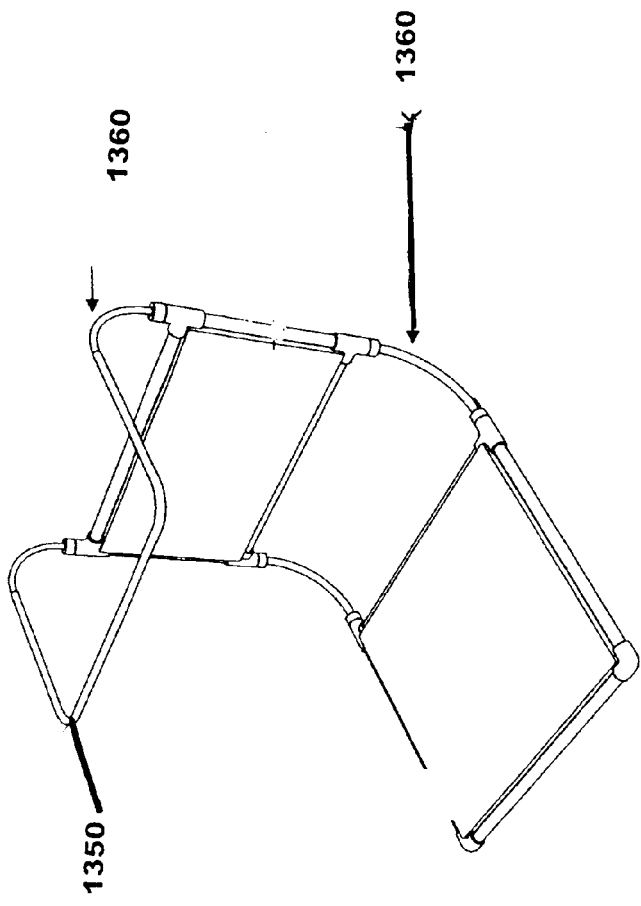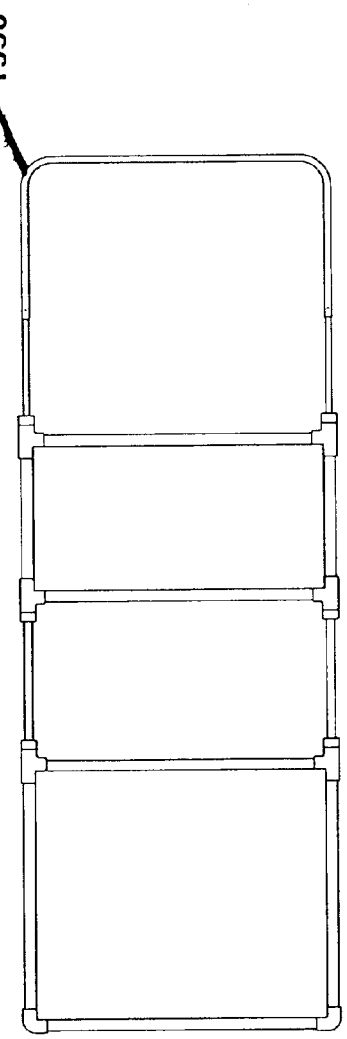
FIG. 17A
FIG. 17B

PET IMPACT PROTECTOR

This application claims priority to U.S. patent application Ser. No. 11/550,257, filed Oct. 17, 2006 and titled PET IMPACT PROTECTOR (now abandoned), which is a non-provisional application that claims priority to U.S. Provisional Patent Application Ser. No. 60/727,337, filed Oct. 17, 2005 and titled PET IMPACT PROTECTOR; and U.S. Design patent application Ser. No. 29/304929, filed Mar. 10, 2008 and titled PUP SAVER, the contents of which are each incorporated herein in their entirety.

FIELD OF THE INVENTION

The invention relates to a pet vehicle accessory. Specifically, the invention relates to a pet vehicle accessory that reduces the impact force to a pet riding in a vehicle when the vehicle stops suddenly or is involved in an accident.

BACKGROUND OF THE INVENTION

It is becoming increasingly common for drivers of motor vehicles to carry a house pet or other animal in their vehicle. Safety concerns for these pets are important, as most pet owners can become very attached to a pet, which can be a loyal companion for many years, thus the life, health, and safety of the pet can be very important to its owner. Various pet safety devices have been developed to protect a pet in an automobile from harm during normal driving conditions, harsh maneuvers, or during an accident, as well as to increase the comfort of a pet being transported in an automobile.

Typically, in a frontal crash, a vehicle's front end will be pushed inward. Forces are directed into the body frame of the vehicle, and deceleration occurs. Almost always, the vehicle stops before the occupants do which causes the occupants to "run into" the interior of the vehicle. Peak deceleration levels are reached generally after the vehicle has stopped its forward motion. "Recoil" then occurs, which causes the occupants to be thrown back, followed by deflection forward again.

Federal Motor Vehicle Safety Standards require vehicles to have numerous safety devices built into the structure of the vehicle to protect human occupants from unreasonable risk of injury during crashes. These Standards dictate both passive and active restraint systems, such as airbags and seat belts. The Standards also set performance standards for the design of the vehicle structure. For example, the front end of the vehicle includes a crush zone designed to limit crash energy, and a safety cage limits intrusion into the occupant compartment. All vehicles must conform to the Standards and certify compliance, which involves crashing the vehicles at 35 mph frontal into a rigid barrier.

Various pet safety devices have been developed to protect a pet in a vehicle from harm during normal driving conditions, harsh maneuvers, or during an accident, as well as to increase the comfort of a pet being transported in an automobile. While restraint systems are designed to protect human occupants, safety seats and harnesses that have been devised for pets generally do not achieve the equivalent degree of safety provided for human occupants of a vehicle. Also, not all drivers purchase a harness for their pet, place the harness on the pet and secure the harness to the seat belt system of the vehicle.

The need for such pet safety devices does not exist when an automobile is operated without a pet on board. For increasing the occupant and loading capacity of a vehicle, the owner of an automobile may, at times, wish to store a pet safety device while not in use. Therefore, it is desirable that a pet safety or restraining device be easy to store.

Heretofore, most automotive pet safety restraint devices have used harnesses and/or tethers to either connect the pet to a seatbelt or to some other part of the automobile. Other safety devices have used nets or the like to surround pets and confine them to a specific area. Still other pet safety devices use a specially designed car seat and tether the pet thereto.

Accordingly, a need arises for a safety device for pets which provides for a reduction of injury to a pet during sudden stops or slowdowns, or an accident. Additional features of such a device should be ease of installation, ease of removal, ease of cleaning, and the like.

Previous pet safety devices have been disclosed. For example, U.S. Pat. No. 2,909,154, issued to L. E. Thomas on Oct. 20, 1959, the contents of which are incorporated herein in its entirety, discloses a tethering strap arrangement for animals riding in a vehicle.

U.S. Pat. No. 3,310,034, issued to H. S. Dishart on Mar. 21, 1967, the contents of which are incorporated herein in its entirety, discloses a safety harness and collar for pet riding in a vehicle.

U.S. Pat. No. D245,716, issued to Anthony J. Russo on Sep. 6, 1977, the contents of which are incorporated herein in its entirety, illustrates a car seat for a domestic animal.

U.S. Pat. No. 4,512,286, issued to Paul R. Rux on Apr. 23, 1985, the contents of which are incorporated herein in its entirety, discloses a pet container for an automobile having a hinged, multi-position front wall and a pet harness connected to the container by a leash.

U.S. Pat. No. 4,597,359, issued to Maurice D. Moorman. on Jul. 1, 1986, the contents of which are incorporated herein in its entirety, discloses a vehicle safety platform for a pet having horizontal mounting arms, a resilient base, a seat belt and a safety harness.

U.S. Pat. No. 4,896,630, issued to Therese G. Luce on Jan. 30, 1990, the contents of which are incorporated herein in its entirety, discloses an animal safety seat belt comprised of upper and lower restraints, front and rear straps, and a securement strap.

U.S. Pat. No. 4,907,541, issued to Paul L. Thompson on Mar. 13, 1990, the contents of which are incorporated herein in its entirety, discloses a pet restraint in a car having a harness with an adjustable flexible belly band, and a flexible chest band joined to the belly band.

U.S. Pat. No. 5,005,526, issued to Charles Parker on Apr. 9, 1991, the contents of which are incorporated herein in its entirety, discloses a collapsible vehicle safety apparatus for animals having a rigid base with a collapsible support frame and a pliable barrier cover attached to the base and held by restraining members.

U.S. Pat. No. 5,123,377, issued to Myrtis C. Edwards on Jun. 23, 1992, the contents of which are incorporated herein in its entirety, discloses a collapsible vehicle safety restraint and seat for pets that includes a padded seat pivotally extended from generally vertically disposed seat back which is removably affixed to an otherwise conventional vehicle.

U.S. Pat. No. 5,479,892, issued to Myrtis C. Edwards on Jan. 2, 1996, the contents of which are incorporated herein in its entirety, discloses a vehicle safety seat for pets having a pet seating portion removably disposed within base portion, with a vehicle safety seat secured to a vehicle passenger seat by securing the vehicle's seat belt portion through the vehicle seat belt passage of base portion.

U.S. Pat. No. 5,685,258, issued to Phillip Fricano on Nov. 11, 1997, the contents of which are incorporated herein in its entirety, discloses a car seat for animals especially dogs comprised of a horizontal seat with a backrest; seat has housing with recess for seat.

U.S. Pat. No. 5,794,571, issued to Carl L. Goldberg on Aug. 18, 1998, the contents of which are incorporated herein in its entirety, discloses a vehicular safety restraint for pets having two joined, closed loops with a breast strap set on the front loop and a tether on the rear loop which is passed through a connecting strap attached to the first loop.

U.S. Pat. No. 5,915,335, issued to Robert C. Holt, Jr. on Jun. 29, 1999, the contents of which are incorporated herein in its entirety, discloses a harness for a dog in an automobile.

U.S. Pat. No. 6,079,370, issued to Maad Al-Birmani and Yousef N. Al-Humidi on Jun. 27, 2000, the contents of which are incorporated herein in its entirety, discloses a car seat for transporting a pet having a net which is separable from and connectable to opposing sides of a back portion and has a predetermined length extending from the sides of the back portion.

U.S. Pat. No. 6,253,713, issued to Louis Albert, Giedeman, III, David James Hoffman, Irmina V. Reyes-Helfrich, Jeffery Kim and Gary Wight on Jul. 3, 2001, the contents of which are incorporated herein in its entirety, discloses a pet restraint system for motor vehicles.

U.S. Pat. No. 6,427,635, issued to Tammy Ballard on Aug. 6, 2002, the contents of which are incorporated herein in its entirety, discloses a vehicle safety restraint for canines comprised of an upper restraint, a lower restraint, a neck strap and a harness strap.

U.S. Pat. No. D461,966, issued to Houstene Reece on Aug. 27, 2002, the contents of which are incorporated herein in its entirety, illustrates an animal automobile seat.

U.S. Pat. No. 6,591,787, issued to James Gantz and Bette A. Gantz on Jul. 15, 2003, the contents of which are incorporated herein in its entirety, discloses a pet console seat for use in connection with automobiles comprised of a bar having a middle, and a seat frame having opposing ends with one end attached to the bar.

U.S. Pat. No. 6,637,377, issued to Mark Lobanoff and Ronald S. Gulette on Oct. 28, 2003, the contents of which are incorporated herein in its entirety, discloses an animal restraint system for a vehicle having a removable, spherically-shaped vest secured to the seat belt of the vehicle via a tether strap, with leg holes for the front legs of an animal.

U.S. Pat. No. 6,827,044, issued to Mark Lobanoff and Ronald S. Gulette on Dec. 7, 2004, the contents of which are incorporated herein in its entirety, discloses an animal restraint system for a vehicle having a top strap extending across the back of an animal wearing the vest from the first to second sides of a vest jacket when the jacket is on the animal to secure the vest to the animal.

SUMMARY OF THE INVENTION

The invention relates to a pet impact protector that provides protection for a pet occupying the pet impact protector from hitting parts of a vehicle, such as the dashboard, during a sudden slowing or stop. The pet impact protector can be easily installed and removed from the car seat. Further, the pet impact protector is washable and some embodiments are adjustable to fit in a variety of locations within a vehicle, as well as a variety of vehicles or a variety of pet sizes.

One embodiment of the invention comprises a soft material that has cushioning properties, e.g. air inflation or foam. In one embodiment, the pet impact protector comprises a polyurethane-polyurea foam formulation having desirable properties such as viscoelasticity, slow recovery, low density, flexible, integral skin/self skinning, optimum shock absorption and flexibility.

A variety of materials and shapes may be used in constructing the invention, as long as the combination provides an impact area for a pet positioned in the pet impact protector in the event of a sudden stop or slowing of the vehicle. The material may be single or double density, and may be fade resistant. The construction of some embodiments of the invention may utilize foam or foam-like materials.

In one embodiment, the height of the pet impact protector can be of a size that when in use it allows a driver of the vehicle to see a passenger-side mirror when the pet impact protector is used in the front passenger seat of a car, yet be of sufficient height to prevent the pet from hitting the windshield. In another embodiment, the pet impact protector can be adjusted to the size of the vehicle and the position in the vehicle to allow good visibility of the driver and good impact protection for the pet. In another embodiments, the pet impact protector can be manufactured in various sizes to fit different pet sizes and also different vehicle dimensions. In other embodiments, the pet impact protector can be adjustable through inflation or extension of seating or capture areas to accommodate various pet sizes and vehicle dimensions.

Some embodiments may be operable and enabled for inflation. Some embodiments may be used in any of the seats of a vehicle other than the driver seat. Optionally the pet impact protector may include a tether for restraining the pet occupying the pet impact protector.

In operation, the force of the moving pet impact protector and a pet occupying the pet impact protector in the travel direction of a vehicle during a crash, sudden slowdown or stop of the vehicle causes the pet impact protector to slide into contact with a portion of the vehicle. Upon contact, the pet may be thrown or otherwise slides into a capture area of the pet impact protector. The capture area folds toward the occupying pet upon contact, forming a protective impact area around the pet. In some embodiments, the pet impact protector may already be in contact with the vehicle and the force of the crash, slowdown or stop of the vehicle may accelerate the pet impact protector toward the front of the vehicle, causing the pet impact protector to fold and form the protective impact area. The pet impact protector can be situated in the vehicle such that the pet impact protector along with the pet slide upon vehicle slowing or stopping into an area of the vehicle that provides structural protection due to the vehicle structural design. For example, the pet impact protector may slide into the legroom area of the front passenger seat of a car after it folds to form the protective impact area. Due to the safety cage design of the occupant compartment of the vehicle, the pet may thus further be protected from injury. The pet impact protector may be designed such that deployment of an airbag causes the folding of the pet impact protector around the pet.

Some embodiments of the pet impact protector may have a handle for carrying. Some embodiments of the pet impact protector may be weighted on the bottom to reduce movement within the vehicle during normal travel. Some embodiments of the pet impact protector may have attachment areas for engaging restraints of vehicles, such as seat belts, that attach the pet impact protector to a seat of the vehicle. In some embodiments, the bottom surface of the pet impact protector may be made of or coated with a material to reduce friction with the vehicle and encourage sliding during vehicle slowing or stopping. The friction reduction may be limited such that sliding does not occur during normal vehicle operation.

In one embodiment, the pet impact protector comprises a seating area for a pet, a right side and a left side that are adjacent to the seating area and a front barrier, or capture area, facing the pet that provides cushioning between the pet and the part of the vehicle behind the front barrier, e.g. the dashboard, as the pet is propelled forward along with the pet impact protector during slowing or stopping of the vehicle. The pet impact protector may optionally include side curtains which can further protect the pet by preventing the pet from leaving the folded pet impact protector following collapse of the pet impact protector around the pet. One embodiment of the pet impact protector comprises a tubular frame, a seating or bedding area, a capture area, side curtains and a top curtain. The tubular frame may comprise plastic, metal or combinations thereof. The tubular frame may further comprise a rotatable frame section between the framing for the seating area and the capture area, which may comprise a flexible material or a curved frame section with a gooseneck or swivel connection between the framing for the seating area and the capture area. The bedding and impact cushion may be releasably attached to the frame for cleaning. The pet impact protector may be collapsible for storage.

Another advantage of the pet impact protector is that it is easily installed on a vehicle seat.

Another advantage of the pet impact protector is that it is easily removed from a vehicle seat.

Another advantage of the pet impact protector is that it is easy to clean.

Another advantage of the pet impact protector is that is can be made from inexpensive and easy to obtain materials.

The invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

Neither the above summary nor the following detailed description of the invention are not intended to describe each illustrated embodiment or every implementation of the invention.

BRIEF DESCRIPTION OF THE DRAWINGS

The pet impact protector will be described with reference to the accompanying drawings, in which like elements are referenced with like numerals.

FIG. 3B is a right side plan view which illustrates a pet impact protector according to the first embodiment of the invention.

FIGS. 13A, 13B and 13C are front, rear and side perspective views of a pet impact protector according to a third embodiment of the invention, as configured for a large pet.

FIGS. 14A, 14B and 14C are front, rear and side perspective views of a pet impact protector according to a third embodiment of the invention, as configured for a small pet.

FIGS. 15A, 15B and 15C are side views of a pet impact protector according to a third embodiment of the invention depicting the sequence for folding.

FIGS. 16A and 16B are side perspective views of the pet impact protector according to the third embodiment of the invention in normal operation and following a slowdown or stop of the vehicle.

FIG. 17A is a front perspective view of a tubular frame suitable for a pet impact protector according to the third embodiment of the invention.

FIG. 17B is a top perspective view of a tubular frame suitable for a pet impact protector according to the third embodiment of the invention.

DETAILED DESCRIPTION OF THE INVENTION

Figure 1:
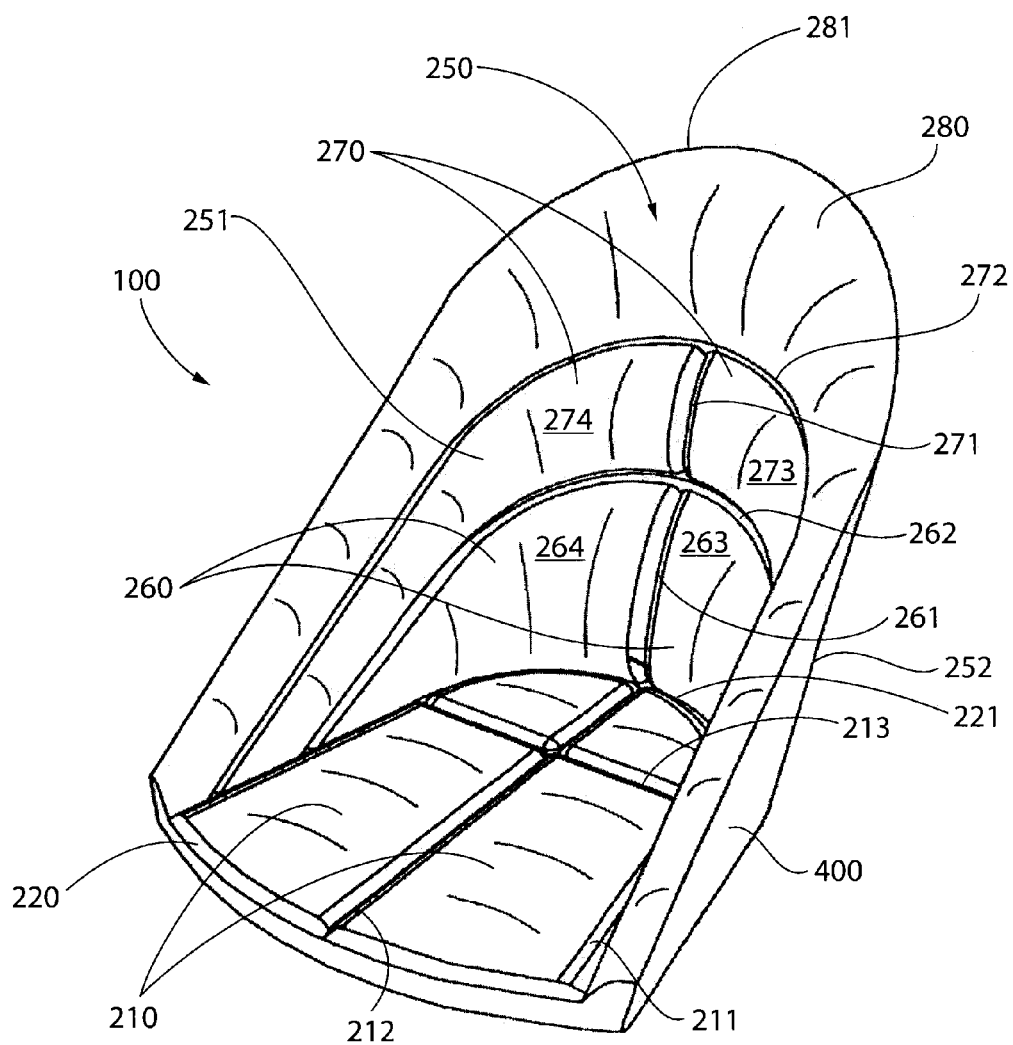
FIG. 1 is a front perspective view which illustrates a pet impact protector according to a first embodiment of the invention.

The invention will be described more fully in the following description. It will be apparent to one skilled in the art that each of these specific details need not be employed to practice the invention. In other instances, well known materials or methods have not been described in detail in order to avoid unnecessarily obscuring the invention.

Referring now to the figures, various embodiments of the invention are illustrated. A first embodiment of a pet impact protector 100 comprising a front 200, a rear 300, a left side 400, a right side 500, and a bottom 600 is depicted in FIGS. 1-8.

Figure 7:
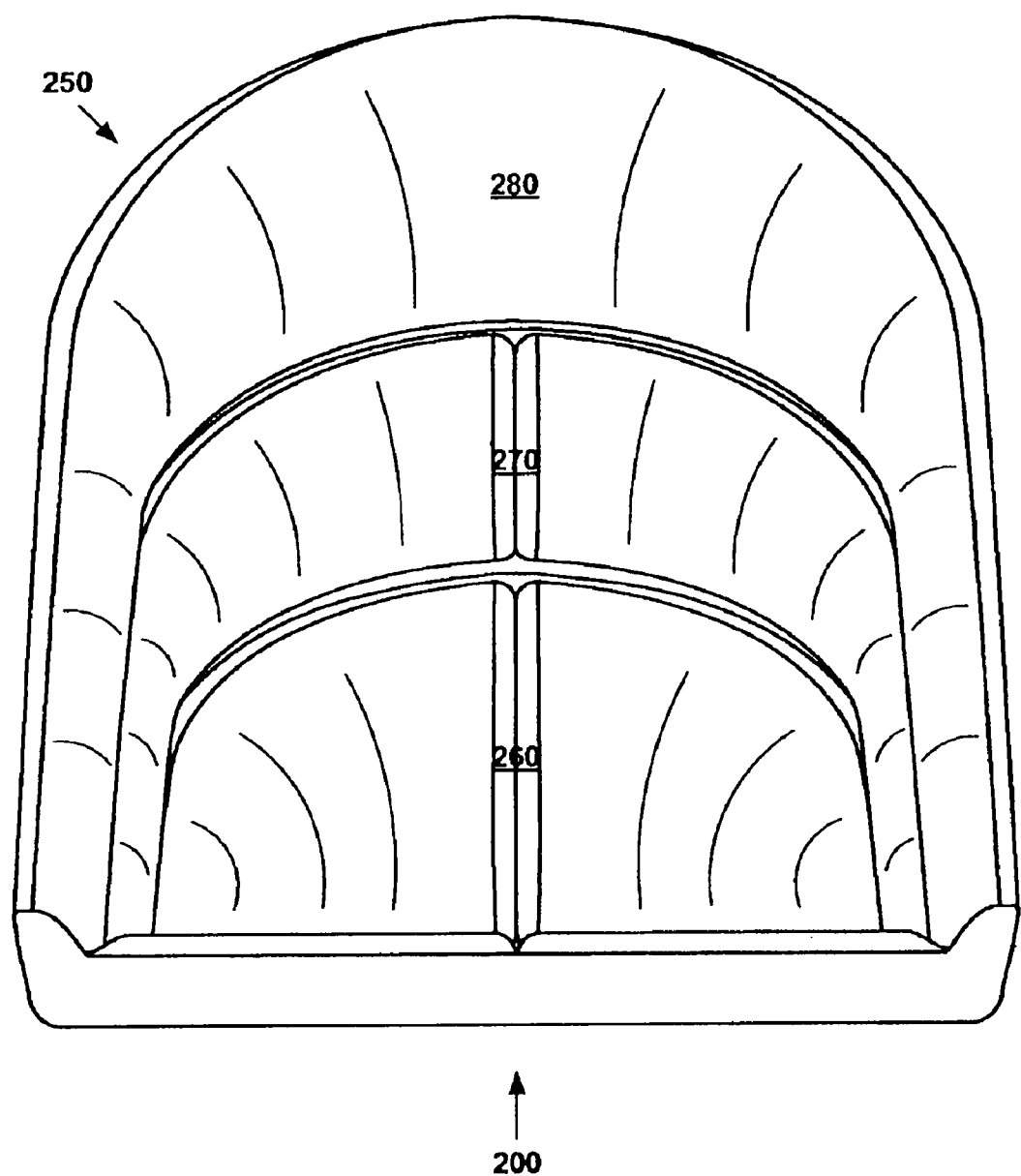
FIG. 7 is a front plan view which illustrates the pet impact protector according to the first embodiment of the invention.

The front 200 of this first embodiment of the pet impact protector 100 comprises a seating area 210 (FIGS. 2A, 2B) and a capture area 250 (FIG. 7). During normal operation, i.e., when a pet occupies the pet impact protector 100 during normal travel in a vehicle, the capture area 250 is angled with respect to the seating area 210, which angle may be a right angle or may be an oblique angle. The seating area 210 and the capture area 250 are connected such that they collapse to form a protective impact area 840, much like a clamshell, around the pet under certain circumstances such as when a force is applied to the rear 300 of the capture area 250 (FIG.

8C). The oblique angle between the seating area 210 and the capture area 250 during collapse may range from 1 degree to 45 degrees.

Figure 2A:
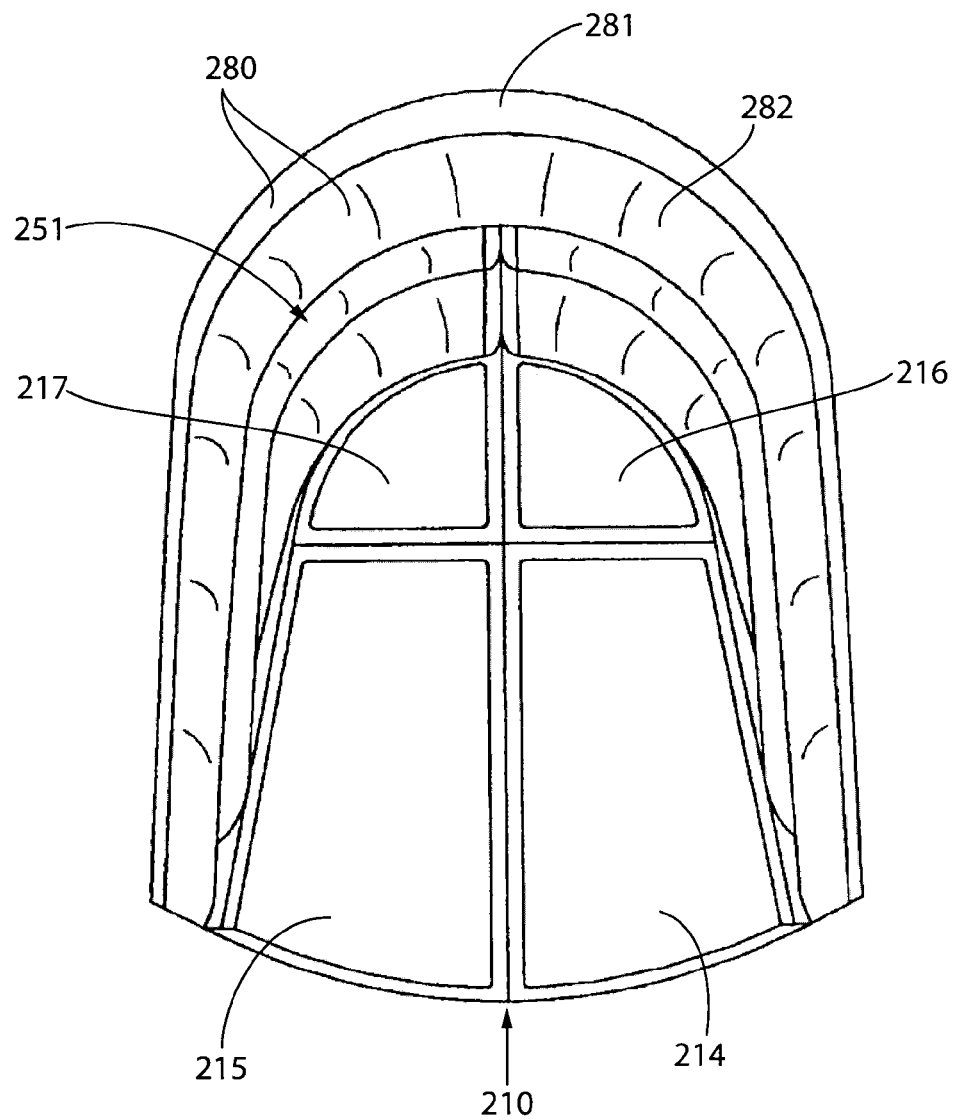
FIG. 2A is a top plan view which illustrates the pet impact protector according to the first embodiment of the invention.
Figure 2B:
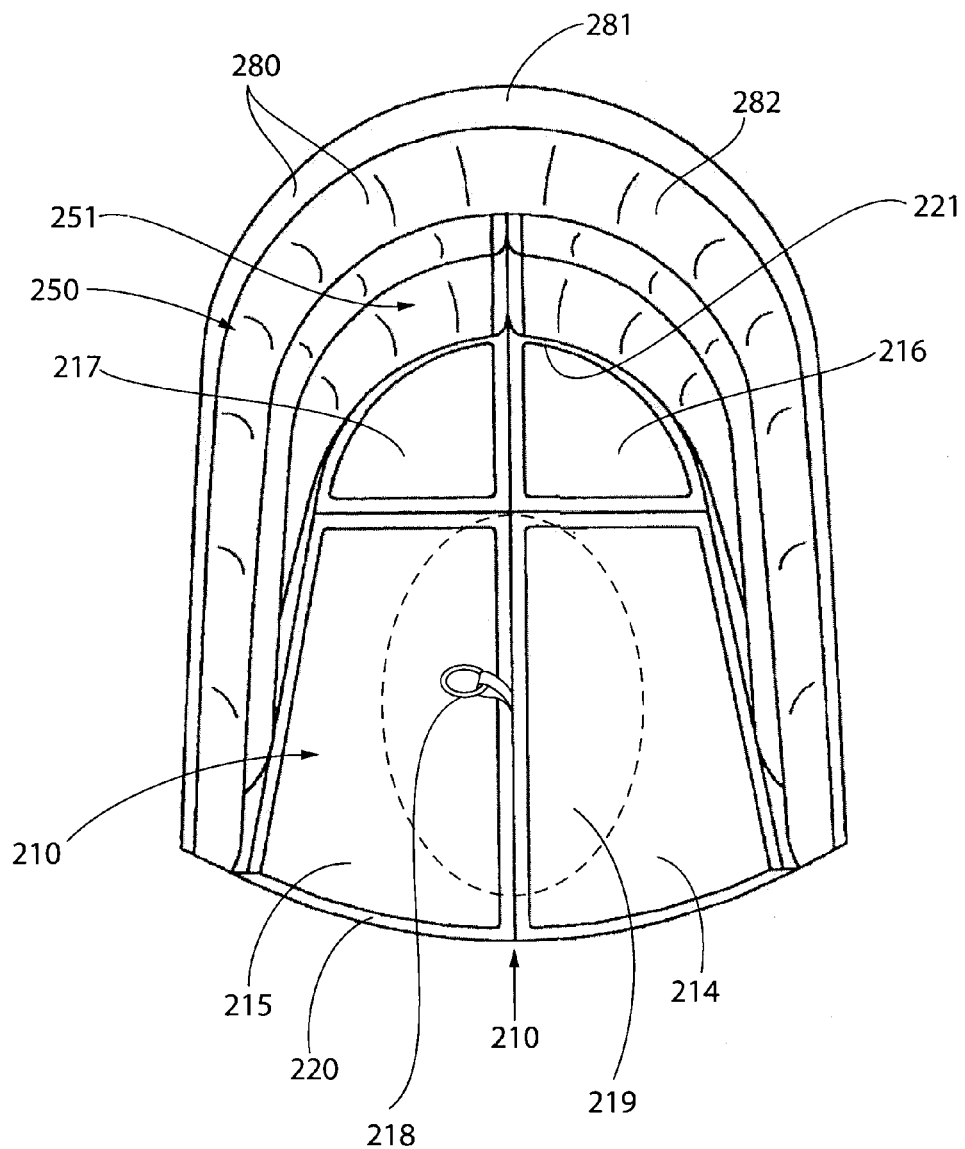
FIG. 2B is a top plan view which illustrates the pet impact protector according to one alternative of the first embodiment of the invention.
Figure 3A:
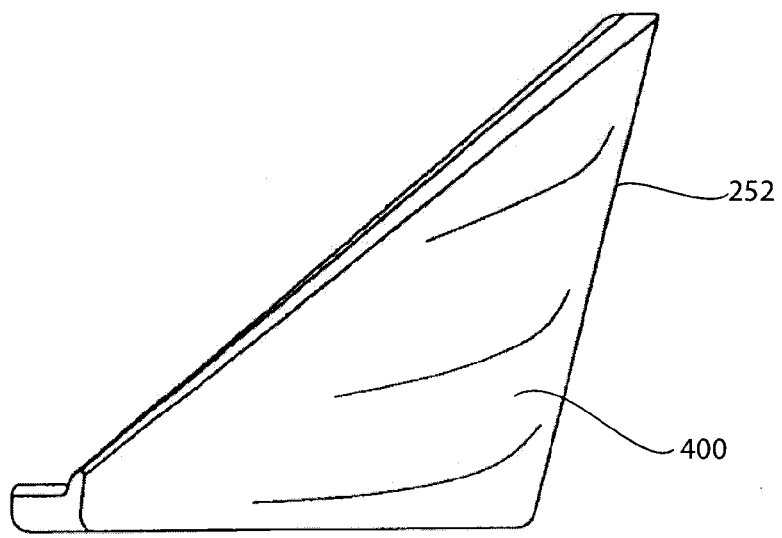
FIGS. 3A and 3B are side plan views which of the pet impact protector according to the first embodiment of the invention.
Figure 3B:
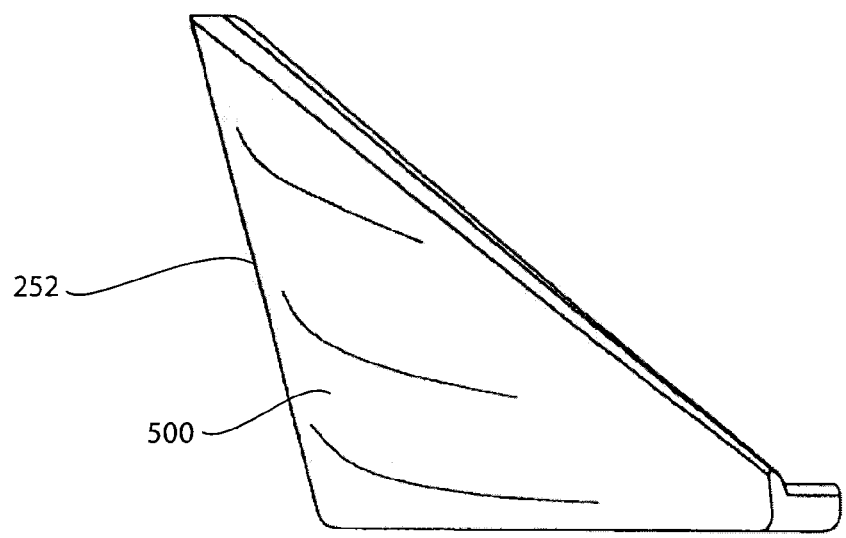
Figure 4:
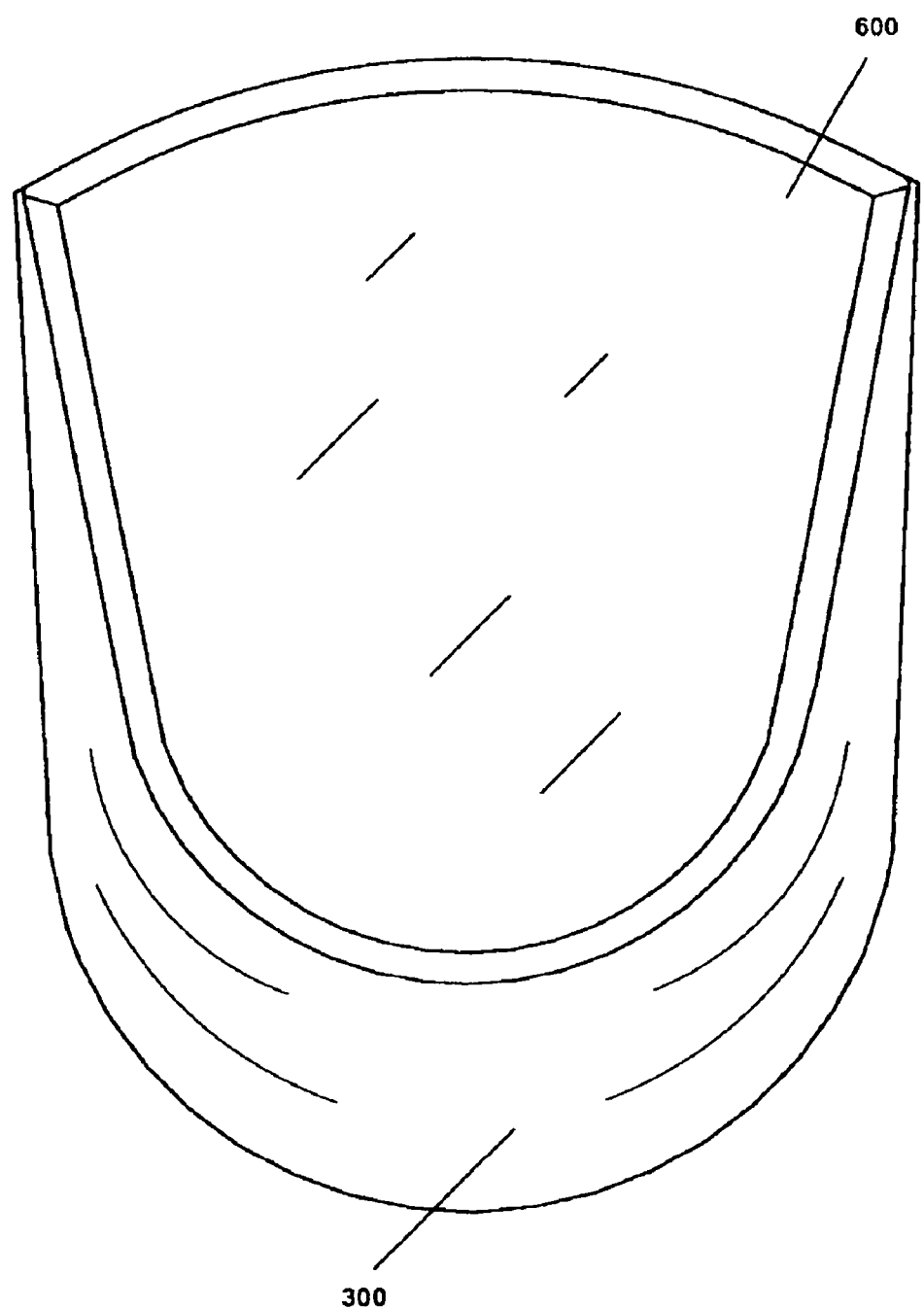
FIG. 4 is a bottom plan view which illustrates the pet impact protector according to the first embodiment of the invention.
Figure 5:
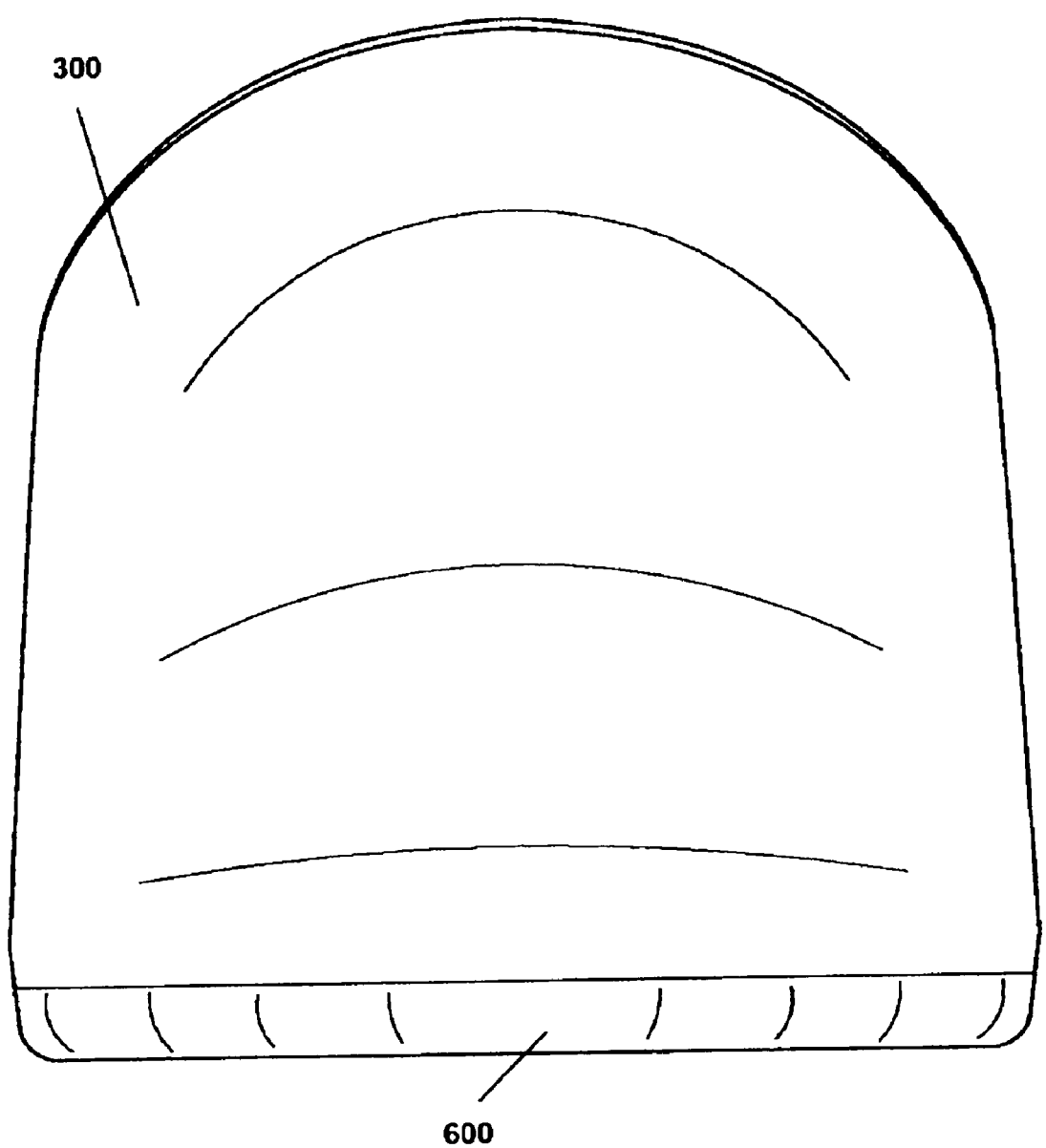
FIG. 5 is a rear plan view which illustrates the pet impact protector according to the first embodiment of the invention.
Figure 6:
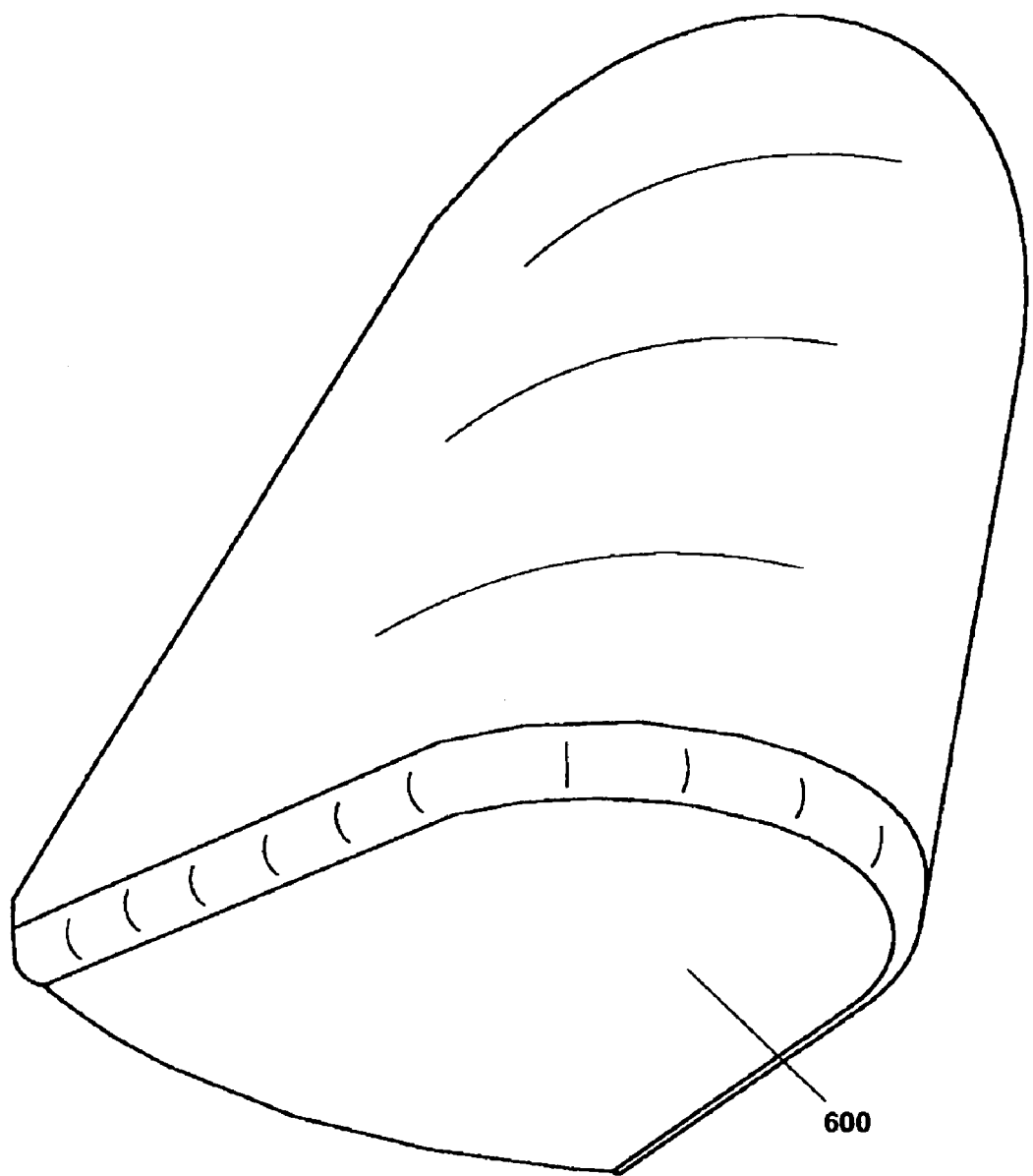
FIG. 6 is a rear perspective view which illustrates the pet impact protector according to the first embodiment of the invention.

As seen in FIGS. 1, 2A and 2B, the seating area 210 comprises a perimeter channel 211, a first dividing channel 212, and a second dividing channel 213. The first dividing channel 212 and the second dividing channel 213 intersect at substantially a right angle and divide the seating area 210 into four quadrants substantially as illustrated. These quadrants are labeled in the figures as left proximal seating area 214, right proximal seating area 215, left distal seating area 216, and right distal seating area 217.

Figure 8A:
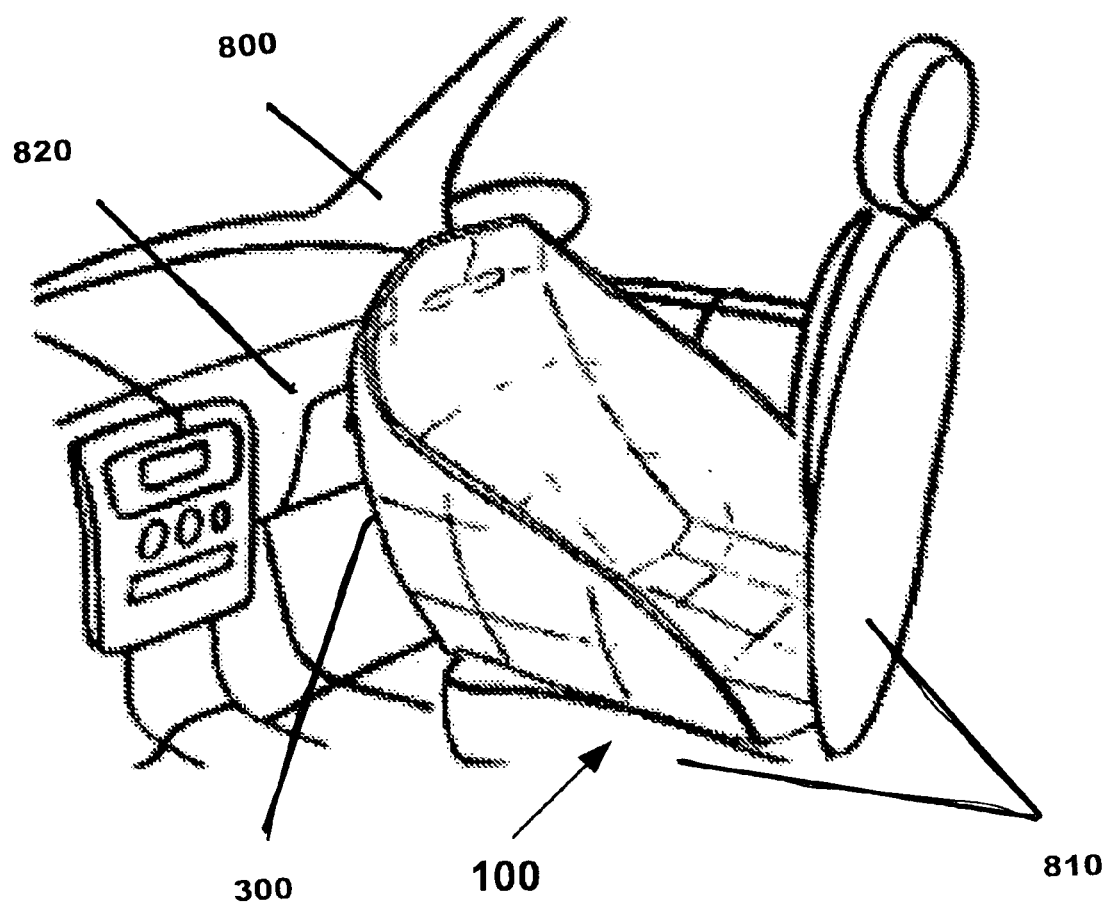
FIG. 8A is a perspective view which illustrates the pet impact protector installed within a vehicle according to the first embodiment of the invention.

The capture area 250 includes a front side 251 facing generally toward and above the seating area, or bed, 210 and a back side 252, facing away from the seating area 210, and comprises of a first capture element 260, a second capture element 270 and a third capture element 280, as seen in FIG. 7. Depending on the size of a pet and force of impact, a pet may come into contact with one or more of these capture elements, e.g. a miniature pet experiencing a moderate impact may come into contact with only the first capture element, during a slowdown or stop of the vehicle, or in an accident. Typically, the pet impact protector 100 is placed in a vehicle with the front 200 of the pet impact protector 100 facing the rear of the vehicle, as seen in FIG. 8A, such that the capture elements 260, 270 and 280 are situated at the front of the vehicle such that the pet is directed into the capture elements 260, 270 and 280 when the vehicle stops or slows while moving forward in the travel direction. Although the pet impact protector 100 is depicted in the front passenger seat in FIG. 8A, it may also be placed in other areas of the vehicle, for example in a back seat (not shown).

The first capture element 260 further comprises a third dividing channel 261, a fourth dividing channel 262, as seen in FIG. 1. The third dividing channel 261 and the fourth dividing channel 262 intersect to form a left first capture segment 263 and a right first capture segment 264.

The second capture element 270 further comprises a fifth dividing channel 271 and a sixth dividing channel 272, as seen in FIG. 1. The fifth dividing channel 271 and the sixth dividing channel 272 intersect to form a left second capture segment 273 and a right second capture segment 274.

The third capture element 280 further comprises a top edge 281 and a third capture segment 282, as seen in FIGS. 2A and 2B.

The pet impact protector of the first embodiment may optionally comprise a tether 218 as seen in FIG. 2B for restraining the pet in the pet impact protector, such tether 218 being positioned intermediate the front portion 218 of the seating bed or area 210 and the rear portion 219 thereof. A support plate 219 for the tether 218 may be, for example, molded into the seating area 210. Alternatively, the tether 218 may be sewn, glued, stapled, pinned or otherwise attached to the seating area 210 (not shown). Alternatively, the tether 218 may be attached to other portions of the pet impact protector.

The pet impact protector 100 may be formed as a single unit through injection molding, but may be formed through other methods. For example, the pet impact protector may be formed with a frame and removable cushions that form the seating area 210 and the capture area 250.

In one embodiment, the invention comprises a cleanable, removable pet impact protector 100 for a vehicle car seat comprising a contiguous pliable material having a seating area 210, means 250, such as inflatable cushions or polyurethane foam, for cushioning the impact of a pet, means for securing the pet impact protector to an interior of a vehicle, and means for inflating the pet impact protector.

Figure 8B:
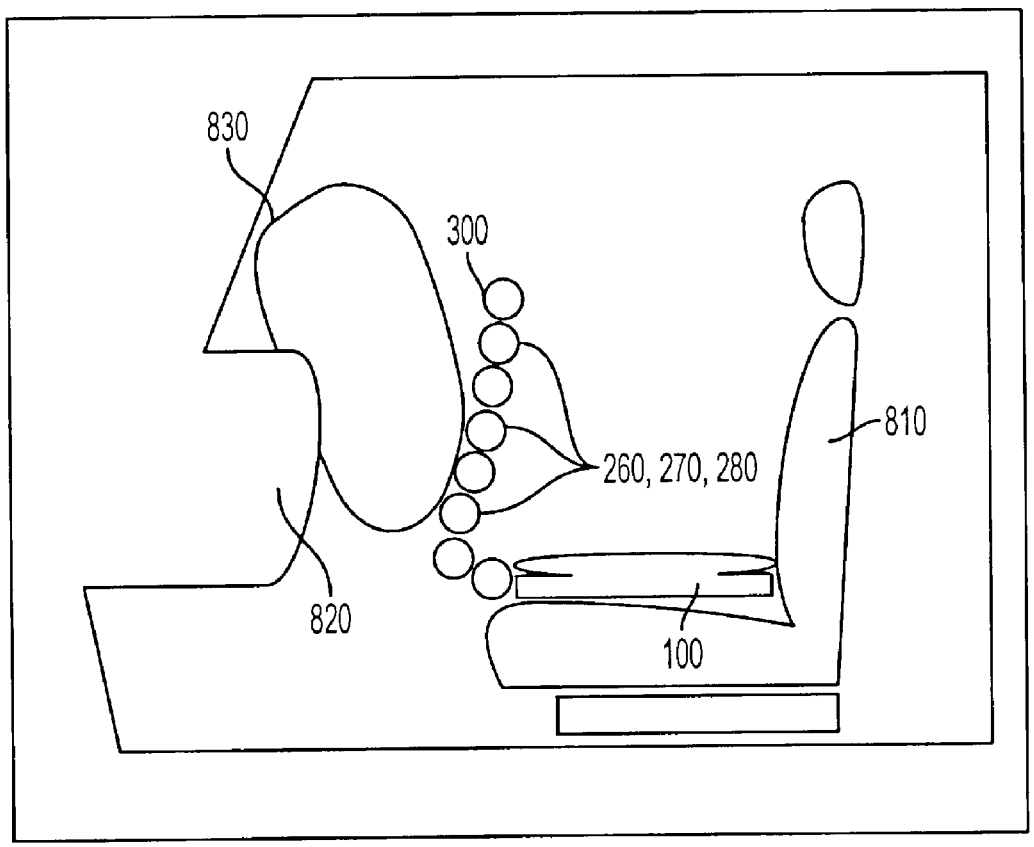
FIG. 8B is a perspective view which illustrates the pet impact protector during air bag deployment within a vehicle according to the first embodiment of the invention.
Figure 8C:
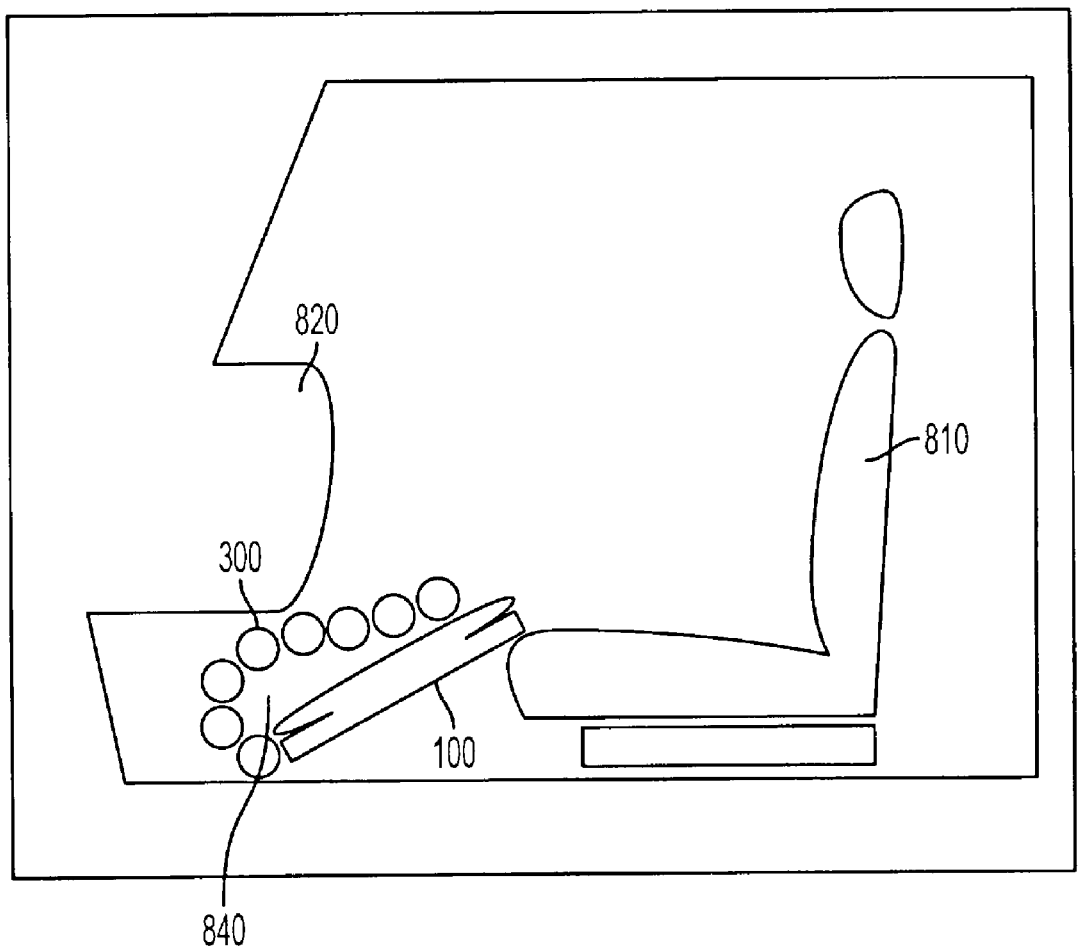
FIG. 8C is a perspective view which illustrates the pet impact protector following a slowdown or stop of the vehicle according to the first embodiment of the invention.

FIGS. 8A-8C depict the operation of the first embodiment of the pet impact protector 100 during slowdown or stopping of a vehicle. As seen in FIG. 8A, the pet impact protector 100 can be positioned in the front passenger seat 810 of a vehicle 800 facing rearward, with the rear 300 facing the dashboard 820 of the vehicle 800. Upon the occurrence of certain conditions such as sudden stops or slowdowns, the pet impact protector 100 is accelerated toward the front of the vehicle 800, which causes one or more of the first, second or third capture areas 260, 270 or 280, to contact the vehicle 800, for example as seen in FIG. 8B the deployed airbag 830, where present in the dashboard 820, or the dashboard 820 (not shown). In certain embodiments, the pet impact protector 100 may already be in contact with the vehicle 800. The force of impact of the rear of the capture elements 260, 270 or 280 against the airbag 830 or dashboard 820 causes the capture elements 260, 270 or 280 to fold toward the seating area 210 and form a protective impact area 840 around the pet (not shown), as seen in FIG. 8C.

Figure 9:
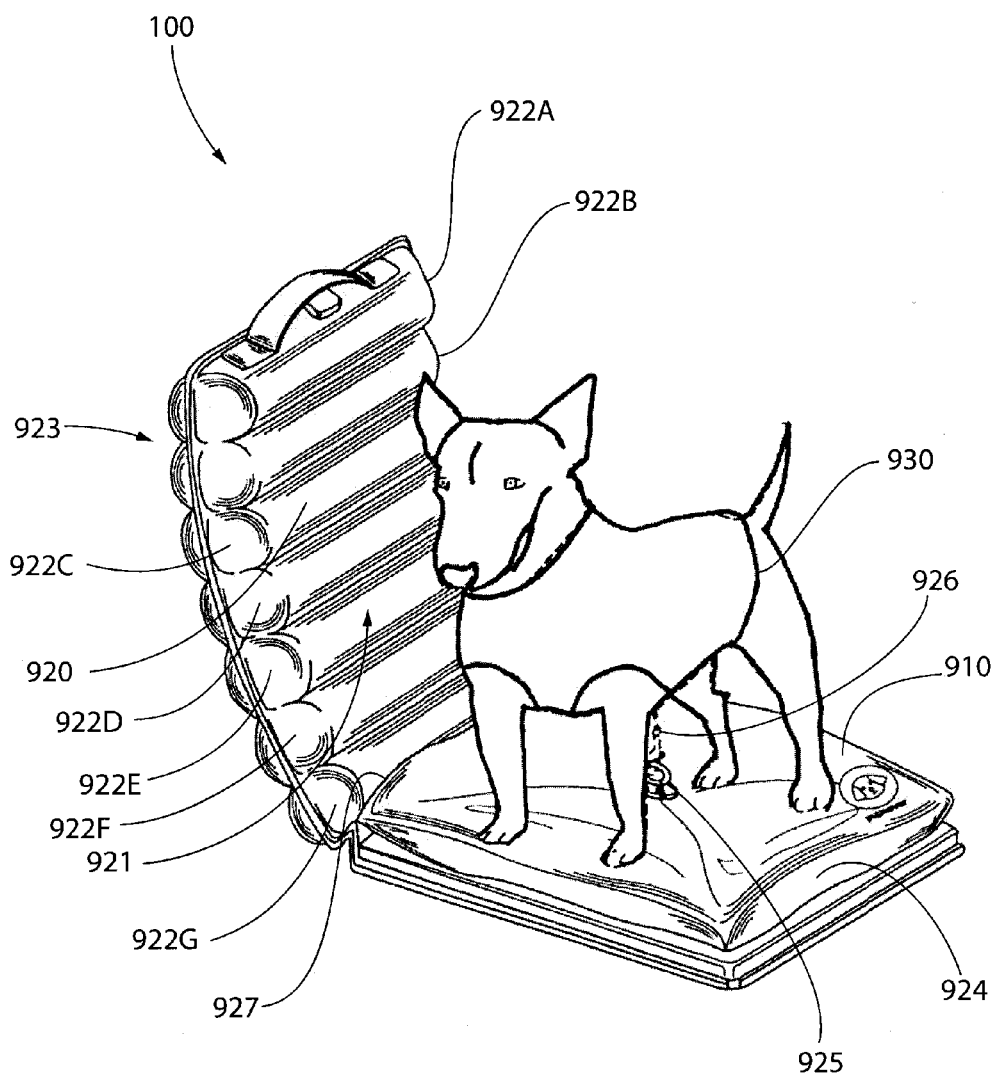
FIG. 9 is a front perspective view which illustrates a foldable pet impact protector, as unfolded and occupied by a pet, according to the second embodiment of the invention.
Figure 11A:
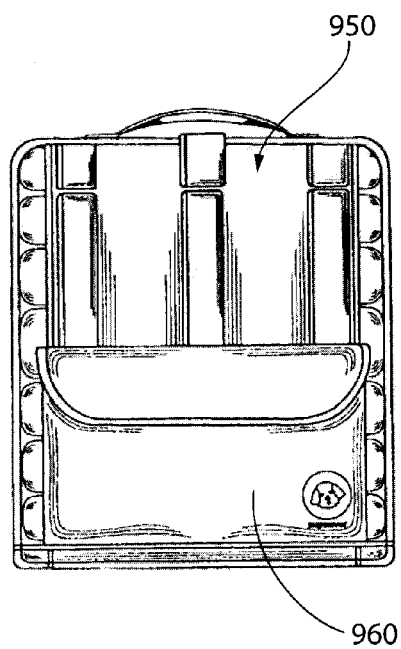
FIGS. 11A and 11B are front and rear views of the second embodiment of the pet impact protector, as folded.
Figure 11B:
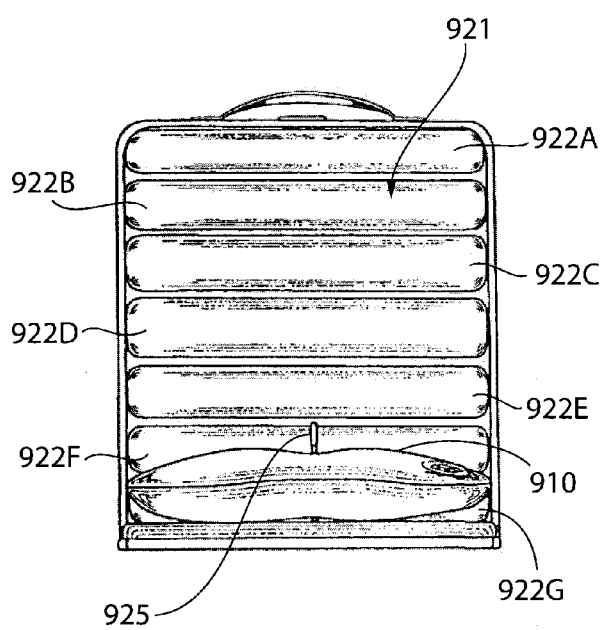
Figure 11C:
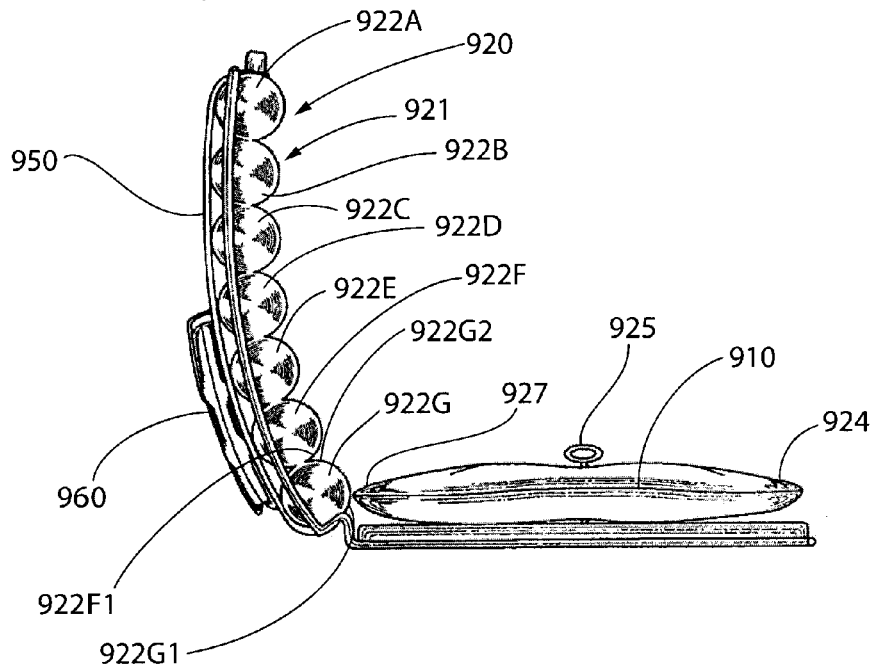
FIGS. 11C and 11D are side views of the second embodiment of the pet impact protector.

A second embodiment of the pet impact protector 100 is seen in FIGS. 9, 11A, 11B, 11C and 12A and 12B. This embodiment comprises a seating bed 910 and a capture area or impact cushion 920, having a front side 921 facing generally toward and above the seating bed 910 and a back side 923 facing generally away from the seating bed 910. Cushion 920 includes a plurality of cushioned capture elements 922A-G, which may suitably be inflatable or cushioned with polyurethane foam. Preferably, at least one capture element, such as element 922G, has a lower portion 922G1 positioned generally adjacent to and connected to the seating bed 910 and an upper portion 922G2 generally spaced from the seating bed 910 (FIG. 11C). An additional capture element, such as element 922F has a lower portion 922F1 positioned generally adjacent upper portion 922G2 of element 922G. Additional capture elements may have similar relationships with adjacent elements, as shown in FIGS. 9 and 11C. In this embodiment at least a portion of each of the capture elements extends generally parallel to the upper surface of the seating bed, while the capture elements in other embodiments may have an angled relationship with the seating bed. A tether 925 may be connected to the bed 910 and to a restraint 926 for restraining a pet 930. Suitably, the tether 925 may be positioned intermediate the front portion 924 and the rear portion 927 of the seating bed 910.

Figure 10:
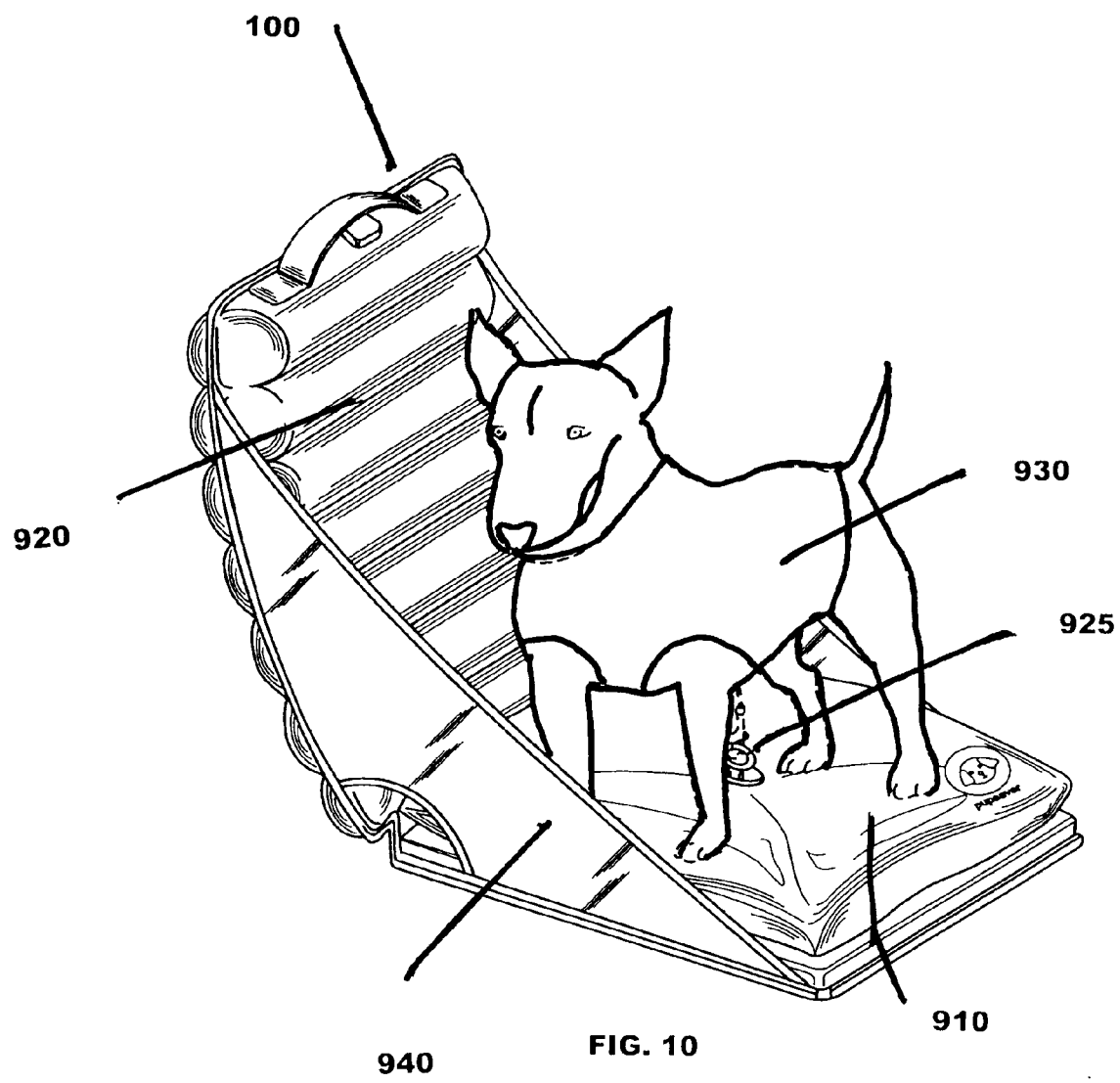
FIG. 10 is a front perspective view which illustrates a foldable pet impact protector, as unfolded and occupied by a pet, according to one alternative of the second embodiment of the invention.
Figure 11D:
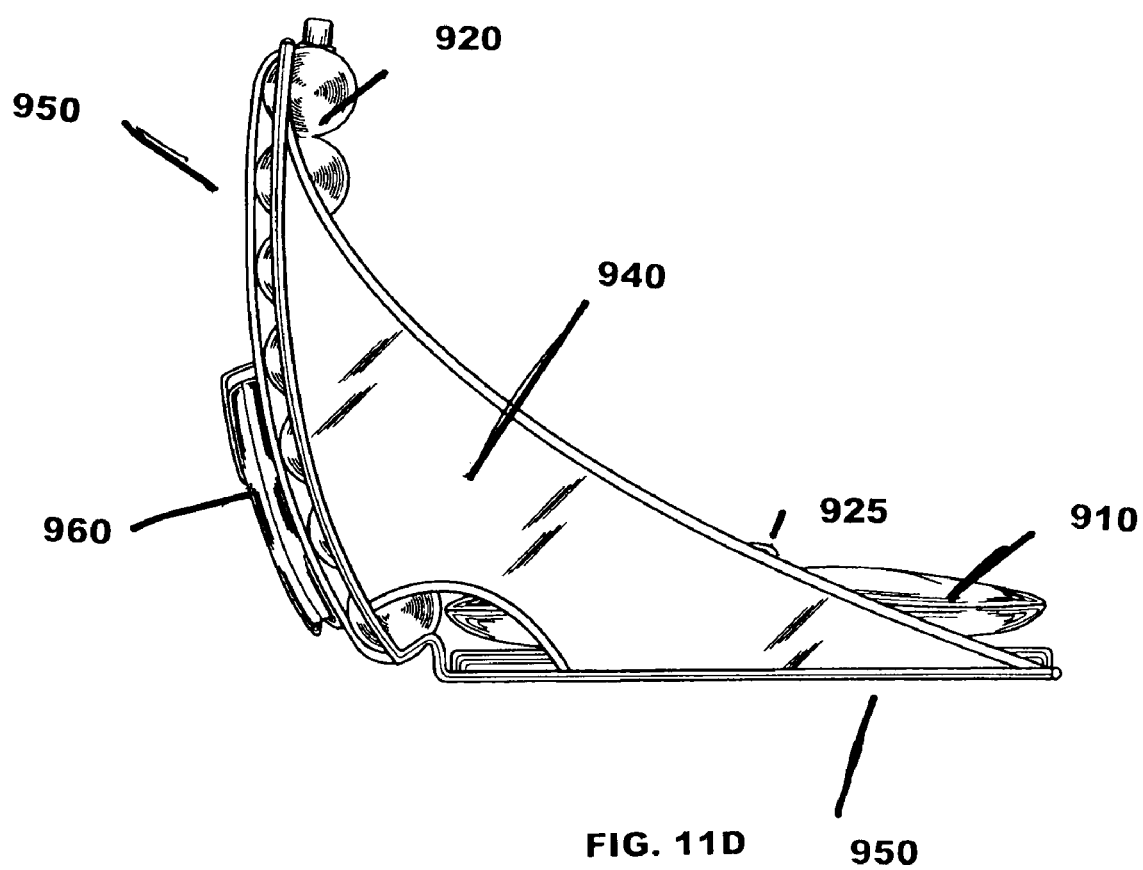
Figure 12A:
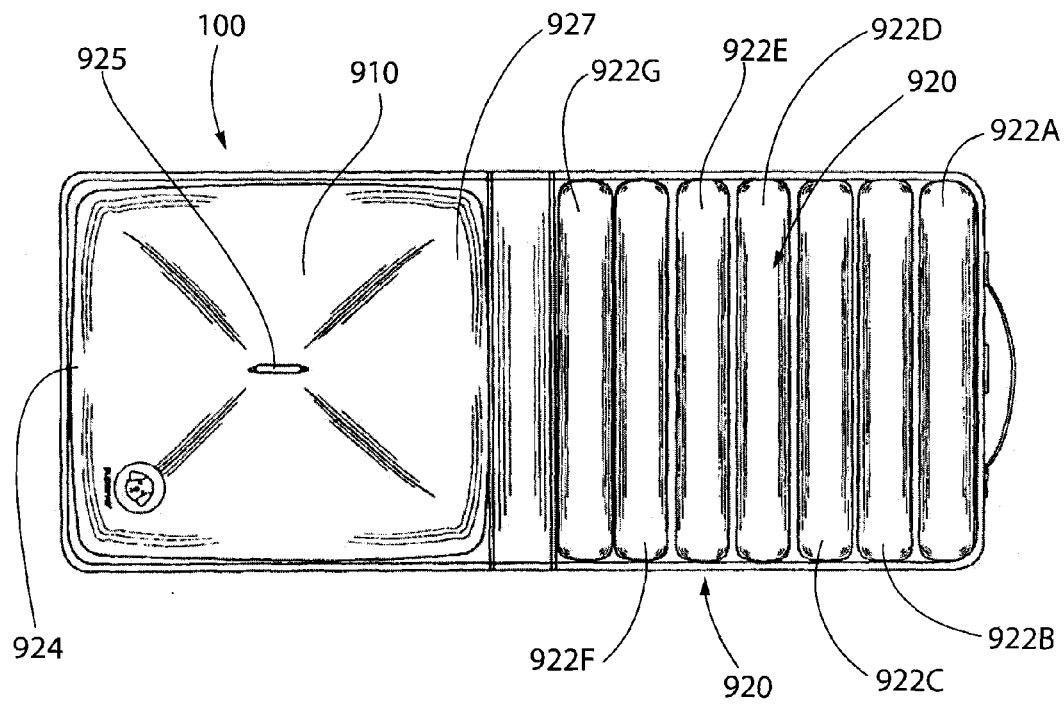
FIGS. 12A and 12B are top and bottom plan views of the second embodiment of the pet impact protector.
Figure 12B:
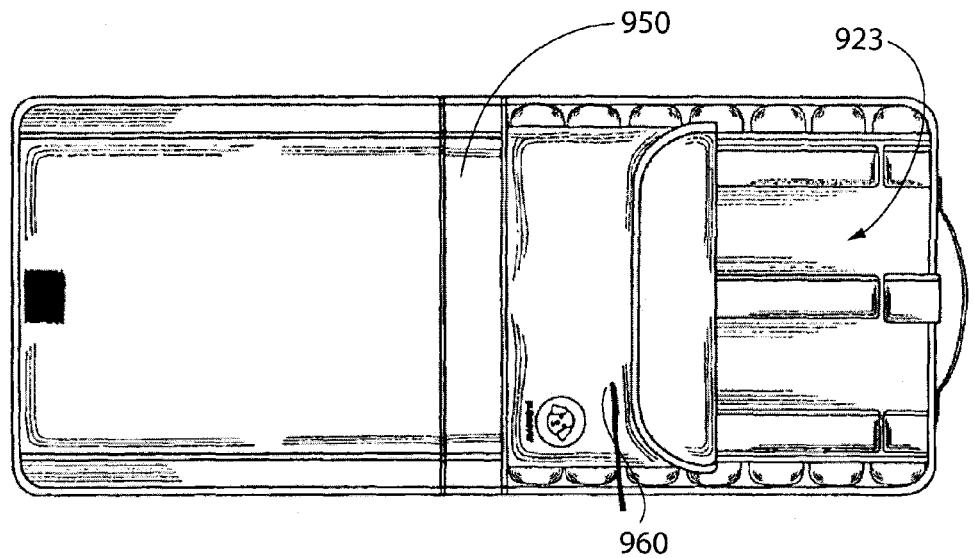

This embodiment may further comprise a side curtain 940, as seen in FIG. 10. The back 950 of the pet impact protector 100, as seen in FIG. 12B, may further comprise a pocket 960. Side views of the second embodiment of the pet impact protector are shown in FIGS. 11C and 11D. This second embodiment operates during slowdown or stopping of the vehicle to form a protective impact area around a pet similar to the first embodiment. This embodiment can be folded as seen in FIGS. 11A and 11B.

In a third embodiment, the pet impact protector 100 is shown in FIGS. 13A, 13B and 13C comprise a bed 1310, an impact cushion 1320 situated at an angle to the bed 1310, a top curtain 1330 situated at an angle to the impact cushion 1320 and substantially parallel to the bed 1310 during normal use in a first mode of operation and side curtains 1340 adjoining the bed 1310, the impact cushion 1320 and the top curtain 1330. In the embodiment as shown, the pet impact protector 100 further comprises a frame 1350. The frame 1350 may comprise plastic, metal or combinations thereof. As shown in more detail in FIGS. 17A and 17B, the frame 1350 is tubular and comprises a rotatable frame section between the framing for the seating area and the impact area, which may comprise a flexible material or a curved frame section 1360 with a gooseneck or swivel connection between the framing for the seating area and the impact area. The bed 1310 and impact cushion 1320 may be releasably attached to the frame 1350 for cleaning.

This embodiment of the pet impact protector 100 may be adapted to fit different sizes of pets. For example, the embodiment depicted in FIGS. 13A, 13B and 13C may be used for large pets, while the embodiment depicted in FIGS. 14A, 14B and 14C may be used for small pets. In this embodiment, the tubular frame 1350 may be configured to provide support for a front curtain 1360 and a side curtain 1320.

As seen in FIGS. 15A, 15B and 15C, the pet impact protector 100 may be collapsible for storage. The tubular frame 1350 may be folded to collapse the side curtain 1340, as seen in FIG. 15B. The tubular frame 1350 may then be further folded as seen in FIG. 15C to collapse the impact cushion 1320 to the bed 1310.

The pet impact protector 100 protects a pet during certain conditions, such as slowdown or stop of the vehicle, as seen in FIGS. 16A and 16B. The pet impact protector 100 can be positioned in the front passenger seat 1610 of a vehicle 1600 facing rearward, with the rear facing the dashboard 1620 of the vehicle 1600. Upon the occurrence of certain conditions such as sudden stops or slowdowns, the pet impact protector 100 is hurtled toward the front of the vehicle 1600, which causes the impact cushion 1320 to contact the vehicle 1600, for example as seen in FIG. 16B the dashboard 1620, or a deployed airbag, where present in the dashboard 1620 (not shown). The force of impact against the dashboard 1620 or airbag causes the pet impact protector 100 to fold toward the bed 1310 and form a cushion or mitt 1640 around the pet 1650, as seen in FIG. 16B.

The foregoing embodiments have been presented for the purpose of illustration and description only and are not to be construed as limiting the scope of the invention in any way. The scope of the invention is to be determined from the claims appended hereto.

What is claimed is:

1. A pet impact protector for protecting a pet travelling in a motor vehicle, comprising
   a seating bed formed of a flexible, cushioned material and including an upwardly facing seating surface for supporting a pet upon said surface,
   a capture area formed of a flexible, cushioned material, having a front side facing generally toward said seating bed and a back side facing away from said seating bed, and connected to and extending upwardly from said seating bed, wherein said seating bed and said capture area are configured to form a protective impact area around a pet occupying said seating bed when folded toward one another, and wherein said seating bed and said capture area are connected such that a force applied to said back side of said capture area causes said capture area to fold toward said seating bed to form a protective impact area, and a tether attached within said seating bed and extending upwardly from said seating surface for attaching to a restraint for a pet within said seating bed, whereby the pet may be restrained generally within the seating bed.

2. The pet impact protector of claim 1 wherein said seating bed comprises a front portion facing generally away from said capture area and a rear portion connected to said capture area.

3. The pet impact protector of claim 2 wherein said tether is attached to said seating bed intermediate said front portion and said rear portion of said seating bed.

4. The pet impact protector of claim 2 wherein said capture area comprises a plurality of cushioned capture elements.

5. The pet impact protector of claim 4 wherein at least one said capture element has a lower portion positioned generally adjacent and facing toward said seating surface and an upper portion facing generally away from said seating bed surface.

6. The pet impact protector of claim 5 further comprising a plurality of additional capture elements, with one such additional capture element having a lower portion adjacent said one capture element upper portion.

7. The pet protector of claim 2 wherein at least a portion of each of said cushioned capture elements extends generally parallel to the upper surface of said seating bed.

8. The pet impact protector of claim 1 wherein said flexible cushioned material comprises polyurethane foam.

* * * * *